United States Patent
Takahashi et al.

[11] Patent Number: 5,831,676
[45] Date of Patent: Nov. 3, 1998

[54] IMAGE PICKUP DEVICE USING PLURAL CONTROL PARAMETERS FOR EXPOSURE CONTROL

[75] Inventors: Koji Takahashi; Kenji Kyuma; Kyoji Tamura, all of Yokohama; Yuji Tsuda, Musashino, all of Japan

[73] Assignee: Canon Kabushiki Kaisha, Tokyo, Japan

[21] Appl. No.: 932,300

[22] Filed: Aug. 19, 1992

[51] Int. Cl.⁶ ..................................................... H04N 5/232
[52] U.S. Cl. .......................... 348/362; 348/364; 348/229; 396/236; 396/242
[58] Field of Search ..................................... 358/228, 909, 358/209, 906; 382/51, 18; 354/443; 348/345, 349, 229, 350, 362, 364; 396/242, 236

[56] References Cited

U.S. PATENT DOCUMENTS

| | | | |
|---|---|---|---|
| 4,534,639 | 8/1985 | Konishi et al. | 354/443 |
| 4,606,065 | 8/1986 | Beg et al. | 382/18 |
| 4,769,668 | 9/1988 | Ishikawa et al. | 354/443 |
| 4,910,600 | 3/1990 | Kondo | 358/228 |
| 5,053,871 | 10/1991 | Ogawa et al. | 358/228 |
| 5,128,769 | 7/1992 | Arai et al. | 358/228 |
| 5,184,169 | 2/1993 | Nishitani | 354/443 |
| 5,194,960 | 3/1993 | Ota | 358/228 |
| 5,212,557 | 5/1993 | Ueda | 348/347 |

*Primary Examiner*—Wendy Garber
*Attorney, Agent, or Firm*—Robin, Blecker & Daley

[57] ABSTRACT

An image pickup device capable of exposure control utilizing the iris aperture, shutter speed and gain as three control parameters, comprising means for setting a photometry area in the image frame; means for setting an input parameter as a reference for evaluation, based on the luminance information in an image signal obtained from the photometry means; means for determining the values of the three control parameters for exposure control, according to the value of the input parameter; switch means for switching, according to the phototaking mode, a program setting the control caharacteristics of each control parameter as a function of the input parameter; and photometry area switch means for switching the set state of the photometry area in the image frame, in linkage with the switching operation of the switch means, wherein the phototaking mode is switched according to the phototaking conditions, thereby controlling the parameters and the light metering area according to a program matching the phototaking mode, and enabling to constantly effect the optimum phototaking operation under any phototaking situation or conditions.

22 Claims, 29 Drawing Sheets

FIG. 6

| 01 | 02 | 03 | 04 | 05 | 06 |
|----|----|----|----|----|----|
| 07 | 08 | 09 | 10 | 11 | 12 |
| 13 | 14 | 15 | 16 | 17 | 18 |
| 19 | 20 | 21 | 22 | 23 | 24 |

FIG. 7

| 0.5 | 0.5 | 0.5 | 0.5 | 0.5 | 0.5 |
|-----|-----|-----|-----|-----|-----|
| 0.5 | 1.0 | 1.0 | 1.0 | 1.0 | 0.5 |
| 0.5 | 1.0 | 1.0 | 1.0 | 1.0 | 0.5 |
| 0.5 | 0.5 | 0.5 | 0.5 | 0.5 | 0.5 |

FIG. 8

| 0.0 | 0.0 | 0.0 | 0.0 | 0.0 | 0.0 |
|-----|-----|-----|-----|-----|-----|
| 0.5 | 0.5 | 0.5 | 0.5 | 0.5 | 0.5 |
| 1.0 | 1.0 | 1.0 | 1.0 | 1.0 | 1.0 |
| 1.0 | 1.0 | 1.0 | 1.0 | 1.0 | 1.0 |

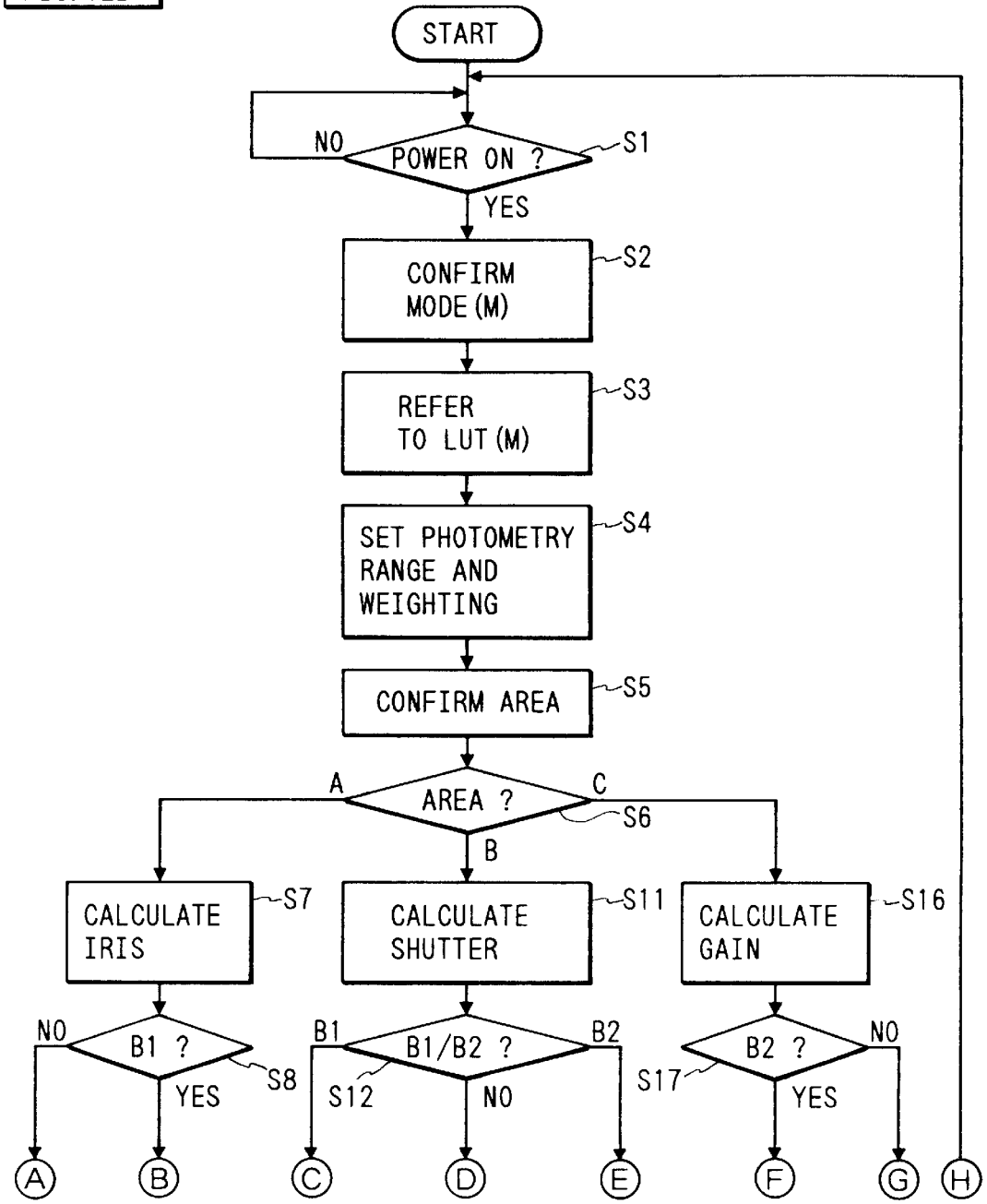

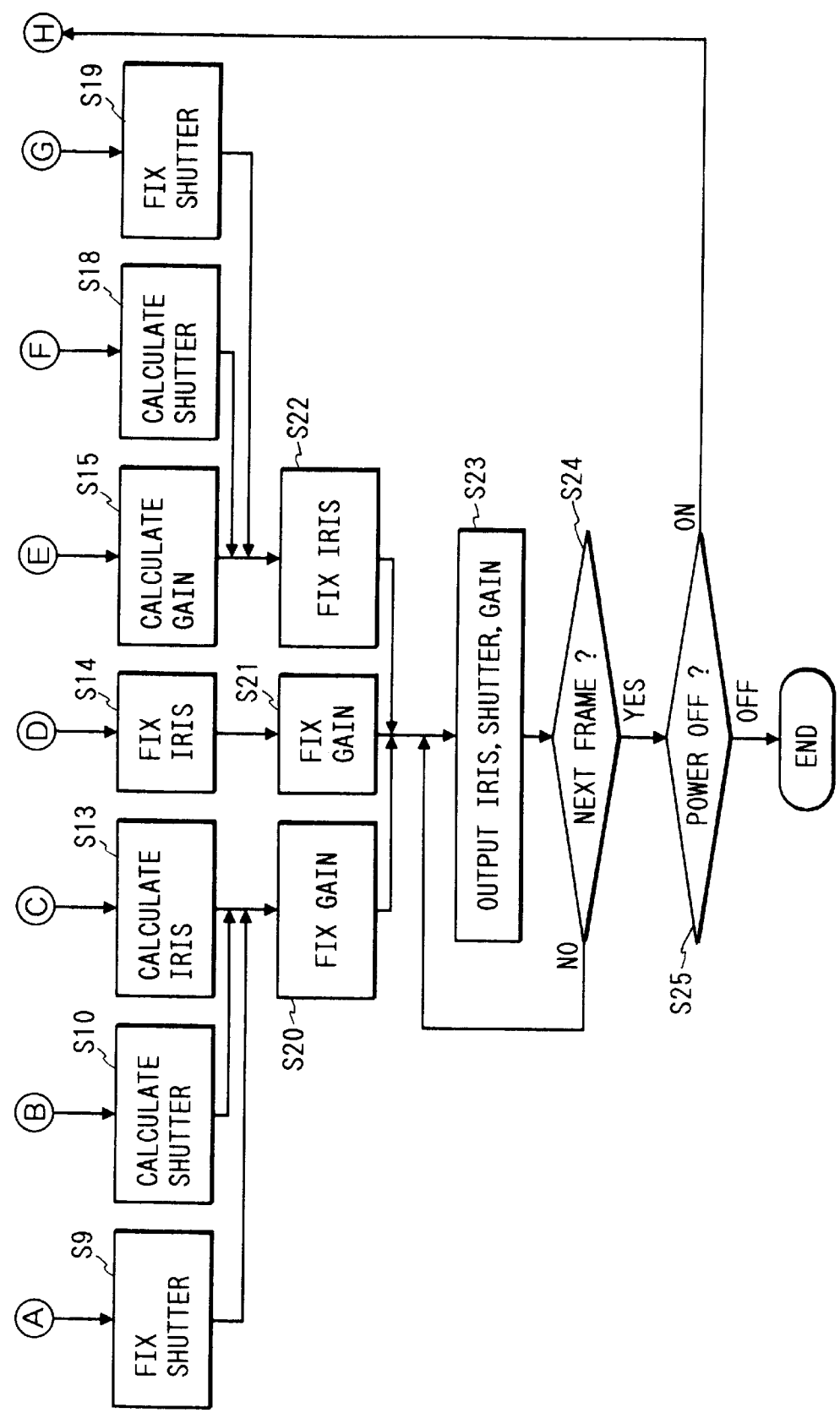

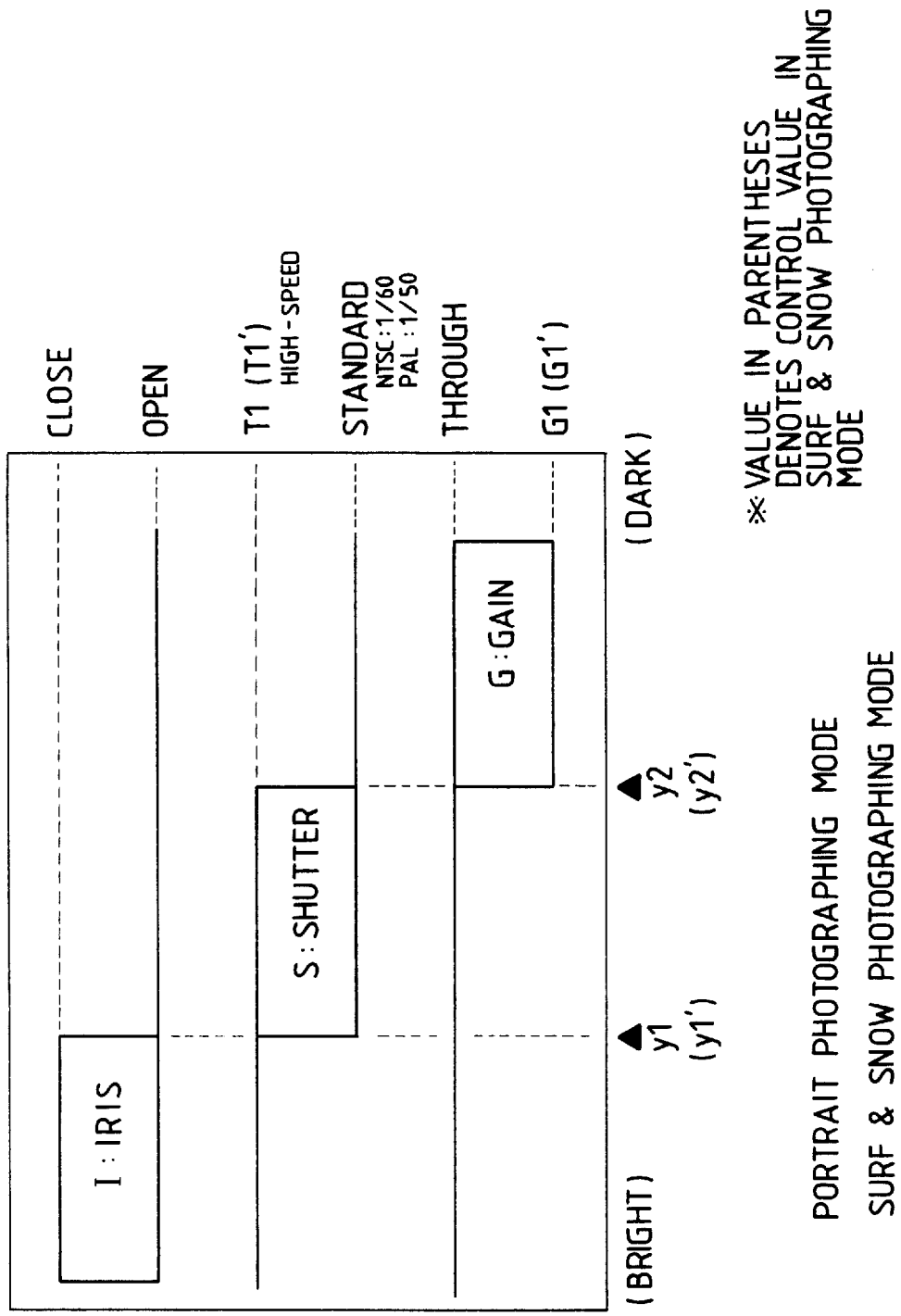

FIG. 18

EXAMPLE OF LUT DATA STRUCTURE (SPOT LIGHT)

| No | PARAMETER | ATTRIBUTION | DATA FORMAT | DATA |
|----|-----------|-------------|-------------|------|
| 01 | IRIS | f(Y) | THRESHOLD DEFINITION | Y≧y1 ⇒ CAL<br>y1>Y ⇒ OPEN |
| 02 | SHUTTER | f(Y) | THRESHOLD DEFINITION | ⇒ STANDARD VALUE |
| 03 | AGC GAIN | f(Y) | THRESHOLD DEFINITION | Y≧y2 ⇒ ±0dB<br>y2>Y ⇒ CAL |
| 04 | AE WAITING | f(Y) | HIST DEFINITION | HIGH-LIGHT<br>2/24BROCKS |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 21

EXAMPLE OF LUT DATA STRUCTURE (PORTRAIT)

| No | PARAMETER | ATTRIBUTION | DATA FORMAT | DATA |
|---|---|---|---|---|
| 01 | IRIS | f(Y) | THRESHOLD DEFINITION | Y≥y1 ⇒ CAL<br>y1>Y ⇒ OPEN |
| 02 | SHUTTER | f(Y) | THRESHOLD DEFINITION | Y≥y1 ⇒ T1<br>y1>Y≥y2 ⇒ CAL<br>y2>Y ⇒ STANDARD VALUE |
| 03 | AGC GAIN | f(Y) | THRESHOLD DEFINITION | Y≥y2 ⇒ ±0dB<br>y2>Y ⇒ CAL |
| 04 | AE WAITING | FIXED | MAP DEFINITION | 0.5 0.5 0.5 0.5 0.5 0.5<br>0.5 1.0 1.0 1.0 1.0 1.0<br>0.5 1.0 1.0 1.0 1.0 1.0<br>0.5 0.5 0.5 0.5 0.5 0.5 |
| 05 | AE REFERENCE VALUE | FIXED | NUMERICAL DEFINITION | 50 [IRE] |
| 06 | IMAGE QUALITY ADJUSTMENT | FIXED | CODE DEFINITION | SOFT |
| 07 | IMAGE EFFECT PROCESSING | FIXED | CODE DEFINITION | WHITE-FADE |

FIG. 22

EXAMPLE OF LUT DATA STRUCTURE (SPORT)

| No | PARAMETER | ATTRIBUTION | DATA FORMAT | DATA |
|----|-----------|-------------|-------------|------|
| 01 | IRIS | f(Y) | THRESHOLD DEFINITION | $Y \geq y1 \Rightarrow CAL$<br>$y1 > Y \Rightarrow OPEN$ |
| 02 | SHUTTER | f(Y) | THRESHOLD DEFINITION | $Y \geq y2 \Rightarrow T1$<br>$y2 > Y \geq y3 \Rightarrow CAL$<br>$y3 > Y \geq y4 \Rightarrow T2$<br>$y4 > Y \geq y5 \Rightarrow CAL$<br>$y5 > Y \Rightarrow STANDARD\ VALUE$ |
| 03 | AGC GAIN | f(Y) | THRESHOLD DEFINITION | $Y \geq y1 \Rightarrow \pm 0dB$<br>$y1 > Y \geq y2 \Rightarrow CAL$<br>$y2 > Y \geq y3 \Rightarrow G1$<br>$y3 > Y \geq y4 \Rightarrow CAL$<br>$y4 > Y \geq y5 \Rightarrow G2$<br>$y5 > Y \Rightarrow CAL$ |
| 04 | AE WAITING | FIXED | MAP DEFINITION | 0.5 \| 0.5 \| 0.5 \| 0.5 \| 0.5 \| 0.5 \| 0.5<br>0.5 \| 1.0 \| 1.0 \| 1.0 \| 1.0 \| 1.0 \| 0.5<br>0.5 \| 1.0 \| 1.0 \| 1.0 \| 1.0 \| 1.0 \| 0.5<br>0.5 \| 0.5 \| 0.5 \| 0.5 \| 0.5 \| 0.5 \| 0.5 |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 24

EXAMPLE OF LUT DATA STRUCTURE (LANDSCAPE)

| No | PARAMETER | ATTRIBUTION | DATA FORMAT | DATA |
|----|-----------|-------------|-------------|------|
| 01 | IRIS | f(Y) | THRESHOLD DEFINITION | Y≥y1 ⇒ CAL<br>y1>Y ⇒ OPEN |
| 02 | SHUTTER | FIXED | NUMERICAL DEFINITION | ⇒ STANDARD VALUE |
| 03 | AGC GAIN | f(Y) | THRESHOLD DEFINITION | Y≥y2 ⇒ ±0dB<br>y2>Y ⇒ CAL |
| 04 | AE WAITING | FIXED | MAP DEFINITION | 0.0  0.0  0.0  0.0  0.0  0.0  0.0<br>0.5  0.5  0.5  0.5  0.5  0.5  0.5<br>1.0  1.0  1.0  1.0  1.0  1.0  1.0<br>1.0  1.0  1.0  1.0  1.0  1.0  1.0 |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 25

EXAMPLE OF LUT DATA STRUCTURE (SURF & SNOW)

| No | PARAMETER | ATTRIBUTION | DATA FORMAT | DATA |
|---|---|---|---|---|
| 01 | IRIS | f(Y) | THRESHOLD DEFINITION | Y≧y1' ⇨ CAL<br>y1'>Y ⇨ OPEN |
| 02 | SHUTTER | f(Y) | THRESHOLD DEFINITION | Y≧y1' ⇨ T1'<br>y1'>Y≧y2' ⇨ CAL<br>y2'>Y ⇨ STANDARD VALUE |
| 03 | AGC GAIN | f(Y) | THRESHOLD DEFINITION | Y≧y2' ⇨ ±0dB<br>y2'>Y ⇨ CAL |
| 04 | AE WAITING | f(Y) | HIST DEFINITION | HIGH-LIGHT<br>12/24BROCKS |
| 05 | AE REFERENCE VALUE | FIXED | NUMERICAL DEFINITION | 80 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 27

SURF & SNOW PHOTOGRAPHING MODE

| 0.0 | 0.0 | 0.0 | 0.0 | 0.0 | 1.0 |
|-----|-----|-----|-----|-----|-----|
| 0.0 | 0.0 | 0.0 | 0.0 | 1.0 | 1.0 |
| 0.0 | 0.0 | 0.0 | 1.0 | 1.0 | 1.0 |
| 1.0 | 1.0 | 1.0 | 1.0 | 1.0 | 1.0 |

FIG. 28

EXAMPLE OF LUT DATA STRUCTURE (FULL AUTO: WITH FLICKER)

| No | PARAMETER | ATTRIBUTION | DATA FORMAT | DATA |
|---|---|---|---|---|
| 01 | IRIS | f(Y) | THRESHOLD DEFINITION | Y≧y1 ⇒ CAL<br>y1>Y≧y2 ⇒ F1<br>y2>Y≧y3 ⇒ CAL<br>y3>Y ⇒ OPEN |
| 02 | SHUTTER | f(Y) | THRESHOLD DEFINITION | Y≧y1 ⇒ T1<br>y1>Y≧y2 ⇒ CAL<br>y2>Y≧y4 ⇒ T2<br>y4>Y≧y5 ⇒ CAL<br>y5>Y ⇒ STANDARD VALUE |
| 03 | AGC GAIN | f(Y) | THRESHOLD DEFINITION | Y≧y3 ⇒ ±0dB<br>y3>Y≧y4 ⇒ CAL<br>y4>Y≧y5 ⇒ G1<br>y5>Y ⇒ CAL |
| 04 | AE WAITING | FIXED | MAP DEFINITION | 0.5 0.5 0.5 0.5 0.5 0.5<br>0.5 1.0 1.0 1.0 1.0 0.5<br>0.5 1.0 1.0 1.0 1.0 0.5<br>0.5 0.5 0.5 0.5 0.5 0.5 |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 30

EXAMPLE OF LUT DATA STRUCTURE (FULL AUTO:FLICKERLESS)

| No | PARAMETER | ATTRIBUTION | DATA FORMAT | DATA |
|---|---|---|---|---|
| 01 | IRIS | f(Y) | THRESHOLD DEFINITION | Y≧y6 ⇒ CAL<br>y6>Y≧y7 ⇒ F1<br>y7>Y≧y8 ⇒ CAL<br>y8>Y ⇒ OPEN |
| 02 | SHUTTER | f(Y) | THRESHOLD DEFINITION | Y≧y6 ⇒ T1<br>y6>Y≧y7 ⇒ CAL<br>y7>Y ⇒ STANDARD VALUE |
| 03 | AGC GAIN | f(Y) | THRESHOLD DEFINITION | Y≧y8 ⇒ ±0dB<br>y8>Y ⇒ CAL |
| 04 | AE WAITING | FIXED | MAP DEFINITION | 0.5 0.5 0.5 0.5 0.5 0.5<br>0.5 1.0 1.0 1.0 1.0 0.5<br>0.5 1.0 1.0 1.0 1.0 0.5<br>0.5 0.5 0.5 0.5 0.5 0.5 |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

IMAGE PICKUP DEVICE USING PLURAL CONTROL PARAMETERS FOR EXPOSURE CONTROL

BACKGROUND OF THE INVENTION

1. Field of the Invention

The present invention relates to an image pickup device adapted for use in a video camera or the like.

2. Related Background Art

Recent remarkable progress in imaging equipment such as video cameras has realized automation of various functions and improvement in operability, such as incorporation of zoom lens, automatic focusing and automatic exposure control. For example, the automatic exposure control is an extremely important feature governing the quality of the obtained image, and has to always function stably and satisfactorily in any phototaking condition.

FIG. 1 is a block diagram showing a basic configuration of the exposure control system of an ordinary video camera, wherein provided are a phototaking optical system 101; an iris (diaphragm) 102 for regulating the amount of incident light; a photo-sensor device 103 such as a CCD, for effecting photoelectric conversion on an image, which is focused by the phototaking optical system on a phototaking face of the device and is regulated in the light amount by the iris, into an image signal; a camera signal processing circuit 104 for applying a predetermined signal processing to the image signal released from said photo-sensor device thereby obtaining a standardized image signal; an image signal output terminal 105; a motor 106 for driving the iris 102 for varying the aperture thereof; an iris driving circuit 107 for controlling the motor 106; a CCD drive circuit 108 for controlling the timing of accumulation, signal readout and resetting of the photo-sensor device 103 and varying the accumulation time (exposure time) of the device thereby obtaining a desired shutter speed; an automatic exposure control (AE) circuit 109 for evaluating the exposure state, based on the luminance signal from the camera signal processing circuit, and obtaining an optimum exposure by controlling the iris drive circuit 107 and the CCD drive circuit 108; and a switch panel 110 for entering key operations.

The exposure control by the AE circuit 109 is conducted in the following manner. There is formed an iris controlling closed loop, for integrating the luminance signal from the signal processing circuit 104, controlling the iris driving circuit 107 so as to maintain the level of said signal within a predetermined range and controlling the drive current to the iris motor for varying the aperture of the iris, and there is provided a control system for controlling the CCD drive circuit 108 to switch the driving pulses thereof in response to the key operation on the switch panel 110, thereby varying the accumulation time of the image pickup device 103 to control the exposure time and to obtain an appropriate exposure. The accumulation time control is called electronic shutter, and can select several stages from 1/100 sec. to 1/10000 sec., in addition to the ordinary exposure time of 1/60 sec. for NTSC standard.

When a high-speed electronic shutter is used in such system, there is assumed so-called shutter priority mode in which the iris is controlled according to an arbitrarily selected shutter speed. FIG. 2 shows said shutter priority mode, in which the shutter speed in the abscissa is at first fixed, and the aperture value in the ordinate is varied accordingly.

However, the above-explained iris control in the shutter priority mode according to the luminance level of the image signal as in the foregoing video camera is unable to provide appropriate exposure control under various phototaking conditions.

In a camera for still image taking, such as a conventional still camera utilizing a silver halide film, the exposure control needs to be appropriate only at the moment of phototaking, but, in case of recording the moving image for a long time as in the video camera, the exposure control has to be conducted in constantly stable and optimum manner, following the continuously varying conditions in the course of phototaking operation, and an exposure control device for video camera, meeting these requirements, has been longed for.

SUMMARY OF THE INVENTION

In consideration of the foregoing, a first object of the present invention is to provide an image pickup device for a video camera always capable of optimum exposure control, regardless of the situation or condition of phototaking.

A second object of the present invention is to provide a video camera capable of always setting an optimum exposure control mode, according to the phototaking situation.

A third object of the present invention is to provide a video camera capable of selecting the phototaking modes according to the phototaking circumstances.

The above-mentioned objects can be attained, according to a preferred embodiment of the present invention, by an image pickup device capable of effecting exposure control with plural control parameters, comprising means for setting a light metering area in the image frame, means for setting an input parameter, based on the luminance information contained in an image signal obtained from said light metering area, means for determining the values of plural control parameters used for exposure control, according to the value of said input parameter, switch means for switching the control parameters relative to said input parameter, according to the phototaking mode, and photometry area switch means for switching the set state of the photometry area in said image frame.

It is therefore rendered possible to set plural control parameters and to control said parameters and the photometry area according to the phototaking conditions, thereby achieving optimum phototaking operation constantly in any phototaking situation or circumstances.

Also according to a preferred embodiment of the present invention, there is disclosed an image pickup device capable of effecting exposure control with plural control parameters, comprising means for setting an input parameter, serving as a reference for evaluation, based on the luminance information obtained from the image signal, means for determining the control parameter used for exposure control, from the iris aperture, shutter speed and gain of AGC circuit, according to the value of the input parameter, at least two data memory means storing the control characteristics of the control parameters corresponding to the input parameter, and selection means for arbitrarily selecting either of the data memory means.

A fourth object of the present invention is to provide an image pickup device constantly capable of optimum exposure control in any phototaking situations such as portrait, indoor phototaking, landscape phototaking, high-speed object (sports) phototaking, snowed landscape phototaking, beach phototaking, full automatic mode, manual phototaking mode etc.

A fifth object of the present invention is to provide an image pickup device capable of optimum exposure control by varying the phototaking mode through combination of plural control parameters and switching the photometry area in response to a change in the phototaking mode.

A sixth object of the present invention is to provide a video camera capable of varying the shutter speed, iris aperture, gain and photometry area, thereby effecting different controls, in plural phototaking modes corresponding to plural phototaking situations.

Still other objects of the present invention, and the features thereof, will become fully apparent from the following description, which is to be taken in conjunction with the attached drawings.

BRIEF DESCRIPTION OF THE DRAWINGS

FIG. 6 is a view showing the mode of area division in the image frame in the present invention;

FIG. 7 is a view showing the setting and weighting of photometry area in the center weighted light metering in the present invention;

FIG. 8 is a view showing the setting and weighting of photometry area in the landscape taking mode in the present invention;

FIG. 12 is a flow chart showing the sequence of setting the parameters shown in FIGS. 9 and 10;

FIG. 17 is a program chart showing the parameter processing in a "portrait mode" and in a "surf and snow mode" of the present invention;

FIG. 18 is a view showing the structure of a data table corresponding to a "spotlight mode" of the present invention;

FIG. 21 is a view showing the structure of a data table corresponding to a "portrait mode";

FIG. 22 is a view showing the structure of a data table corresponding to a "sports mode";

FIG. 24 is a view showing the structure of a data table corresponding to a "landscape mode";

FIG. 25 is a view showing the structure of a data table corresponding to a "surf and snow mode";

FIG. 27 is a view showing the weighting of the light metering area in the "surf and snow mode";

FIG. 28 is a view showing the structure of a data table corresponding to a "full auto mode";

FIG. 30 is a view showing another structure of the data table of the "full auto mode"

DESCRIPTION OF THE PREFERRED EMBODIMENTS

Now the present invention will be clarified in detail by preferred embodiments thereof shown in the attached drawing.

Figure 3:
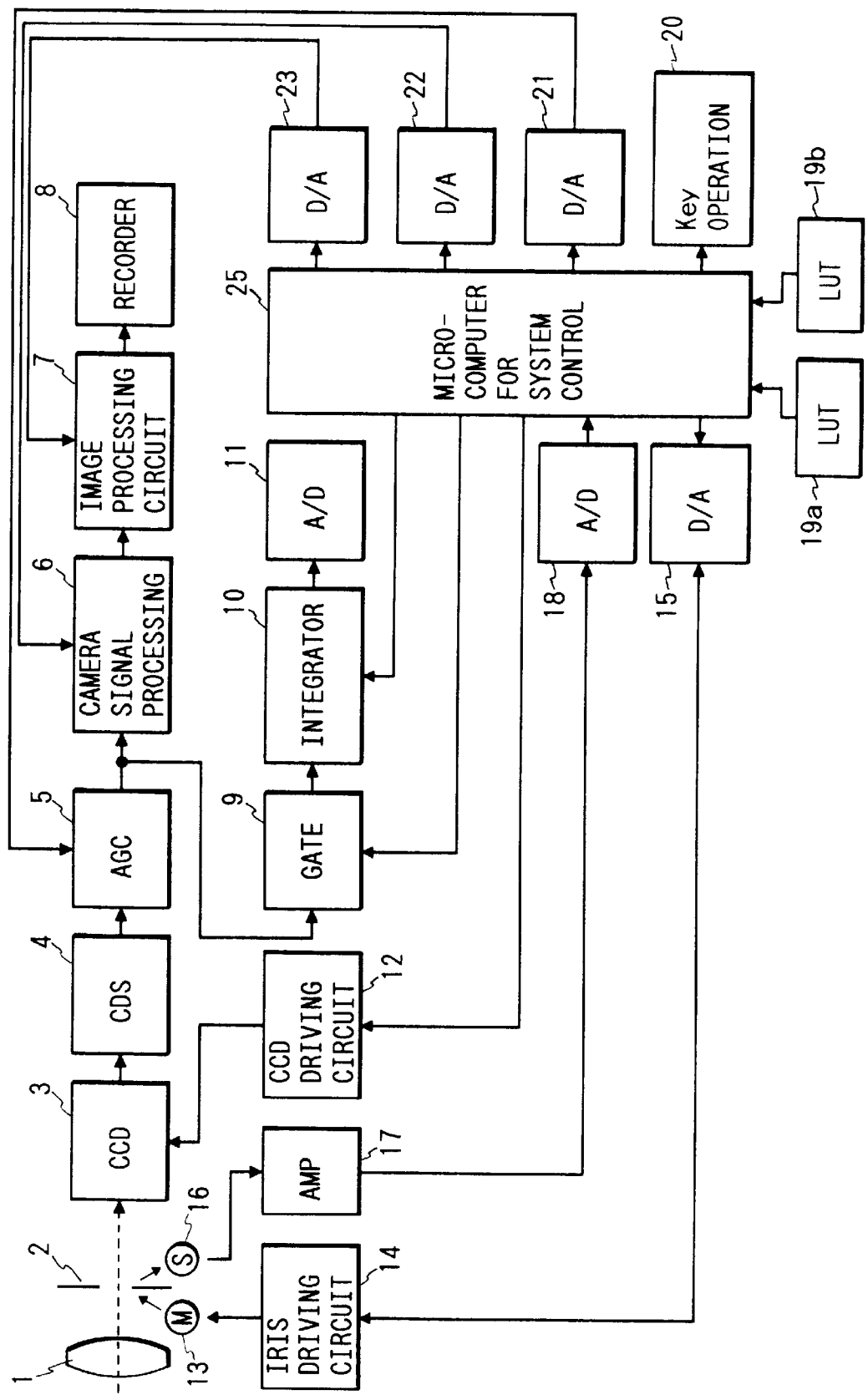
FIG. 3 is a block diagram showing configuration in case the image pickup device of the present invention is applied to the exposure control device of a video camera.

FIG. 3 is a block diagram showing the configuration of an embodiment in which the image pickup device of the present invention is applied to a video camera, wherein shown are a phototaking optical system 1; an iris 2 for regulating the amount of incident light; a photo-sensor device 3, such as a CCD, for effecting photoelectric conversion on an image which is focused on the light-receiving face of said photo-sensor device by the phototaking optical system and of which amount of light is regulated by the iris, to obtain an image signal; a circuit 4 for double correlated sampling (CDS) for reducing the noises in the accumulated changes of the photo-sensor device; an AGC circuit 5 for automatic gain control of the image signal; a camera signal processing circuit 6 for applying a predetermined signal processing to the image signal released from the AGC circuit 5 to obtain a standardized image signal; an image signal processing circuit 7 for converting the image signal; released from the camera signal processing circuit 6 into a signal suitable for recording on a video cassette recorder or the like; and a video cassette recorder 8 employing a magnetic tape as the recording medium.

There are also shown a gate circuit 9 for dividing the image frame into plural areas and gating the signal released from the AGC circuit 5 in order to extract the image signal corresponding to an arbitrary area; an integrator 10 for integrating the image signal; corresponding to a designated area selected by the gate circuit 9 in the image frame, thereby determining the average value of said image signal; and an A/D converter 11 for converting the signal from said integrator 10 into a digital signal that can be processed by a system control circuit to be explained later. The area designation by said gate circuit 9 and the integrating performance of the integrator 10, relating to the designation and weighting of the light metering area corresponding to the phototaking mode, can be arbitrarily selected by gate pulses and integration reset pulses released from a system control circuit 13, as will be explained later.

There are further shown a CCD drive circuit 12 for controlling the accumulation, signal readout and resetting of the photo-sensor device 3; and iris motor 13 for driving the iris 2; an iris drive circuit 14 for driving the iris motor 13; a D/A converter 15 for converting an digital iris control signal, released from the system control circuit, into an analog signal; an iris encoder 16 composed, for example, of a Hall element, for detecting the aperture or stop value of the iris; an amplifier 17 for amplifying the output of the iris encoder 16; and an A/D converter 18 for converting the output of the iris encoder, amplified to a predetermined level by the amplifier 17, into a digital signal that can be processed by the system control circuit.

There are also provided look-up tables (LUT) 19a, 19b storing various data for exposure control. In the present embodiment, in order to enable plural settings according to the phototaking situation, there are provided two tables (in fact a table is provided for each of the phototaking modes explained later, and the number of said tables is increased or decreased according to the number of the phototaking modes). More specifically, each table stores information on the control characteristics of the exposure control parameters such as the iris aperture, shutter speed and gain, corresponding to each of the plural phototaking modes, and the necessary data are read according to the selected phototaking mode.

There are further provided an operation unit 20 including plural operation keys for effecting various operations; a D/A converter 21 for converting a digital gain control signal, released from the system control circuit, into an analog control signal for supply to the AGC circuit; and D/A converters 22, 23 for converting digital control signals, released from the system control circuit for varying or modifying the characteristics of camera signal processing and image signal processing according to the phototaking situation, into analog control signals for respective supply to the camera signal processing circuit 6 and the image signal processing circuit 7.

A system control circuit 25 is composed of a microcomputer and serves to effect overall control on the entire video camera system.

The system control circuit 25 releases, through the D/A converters 22, 23, control signals for controlling the characteristics of the camera signal processing circuit 6 and the image signal processing circuit 7 according to the phototaking mode selected by the operation unit 20, also controls the gate pulses supplied to the gate circuit 9 according to the phototaking mode, thereby setting the light metering area on the image frame, and controls the integration resetting pulses supplied to the integrator 10, thereby selecting the characteristics of the integrating operation thereof.

Figure 4:
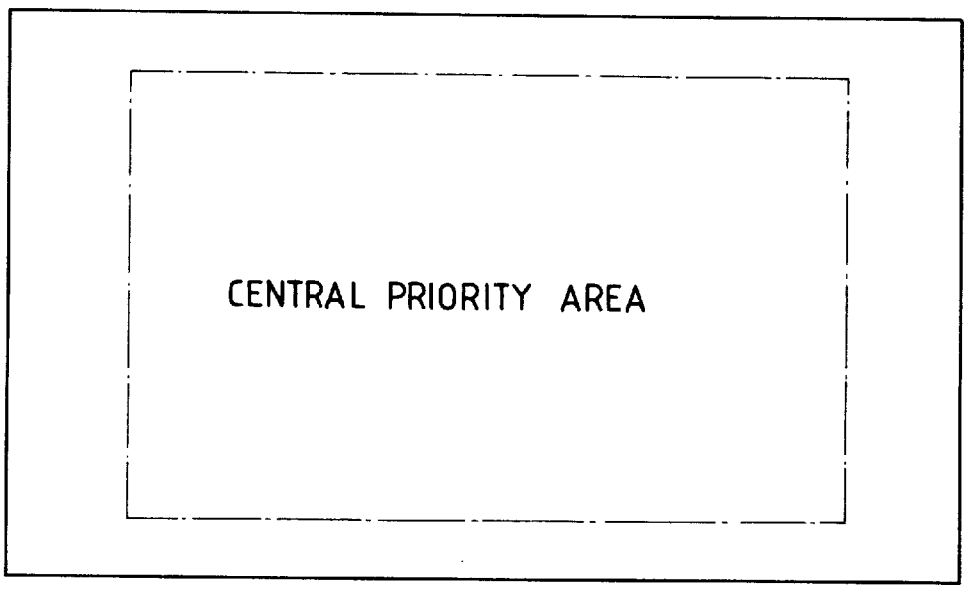
FIG. 4 is a view showing a light metering area in a center weighted light metering.

FIG. 4 shows an example of the setting of the light metering area in the image frame, illustrating the area setting for "center-weighted light metering" in which the photometry area is set in the central area of the image frame and the signal in said area is preferentially employed in the calculation of exposure control.

This setting is based on an empirical rule that the main object has a high probability of being positioned in the central area of the image frame, and, in the exposure calculation, the inner signal inside the central area indicated by a chain line is given a larger coefficient than in the outer signal to give a larger weighting to the central area.

The system control circuit 25 fetches the integrated value, according to the phototaking mode, of the image signal of the light metering area, obtained through the gate circuit 9, then calculates an iris control signal corresponding to the phototaking situation by referring to the look-up table 19, and supplies said iris control signal to the iris drive circuit 14 through the D/A converter 15. It also supplies the gain control signal to the AGC circuit 5 through the D/A converter 21, thereby varying the gain of said AGC circuit 5 according to the phototaking mode and the phototaking situation, and sends the control signal to the CCD drive circuit 12, thereby controlling the accumulation time (electronic shutter), readout timing and reset timing of the photo-sensor device according to the phototaking mode and the phototaking situation.

These controls are conducted, depending on the phototaking mode, with reference to the output of the iris encoder 16, and are effected selectively or in suitable combination.

As explained above, the system control circuit 25 effects the iris control, gain control and photo-sensor device control (for example by control of the accumulation time) explained above at the same time or in suitable combination, according to the phototaking mode, phototaking situation and iris driving state, thereby achieving optimum exposure control in any situation.

The image pickup device of the present invention is constructed as explained above, and the detailed functions thereof will be explained in the following.

At first there will be explained various control parameters employed in the exposure control of the present invention.

(1) Iris Aperture (Parameter PI)

The iris control signal released from the system control circuit is converted into an analog signal by the D/A converter 15, then current amplified in the iris drive circuit 14, and is supplied to the iris motor 13 which in response controls the aperture of the iris 2.

If the integrated value of the integrator 10, supplied through the A/D converter 11, is larger than a control value defined by the LUT 19, the exposure is excessive so that the iris drive circuit 14 is so controlled as to drive the iris motor 13 in a direction to reduce the aperture of the iris 2, whereby the amount of incident light is decreased to lower the output level of the integrator 10.

On the other hand, if the integrated value from the A/D converter 11 is smaller than the control value defined by the LUT 19, the iris motor 13 is driven in the opposite direction to open the iris 2, whereby the amount of incident light is increased to elevate the integrated value.

Figure 5A:
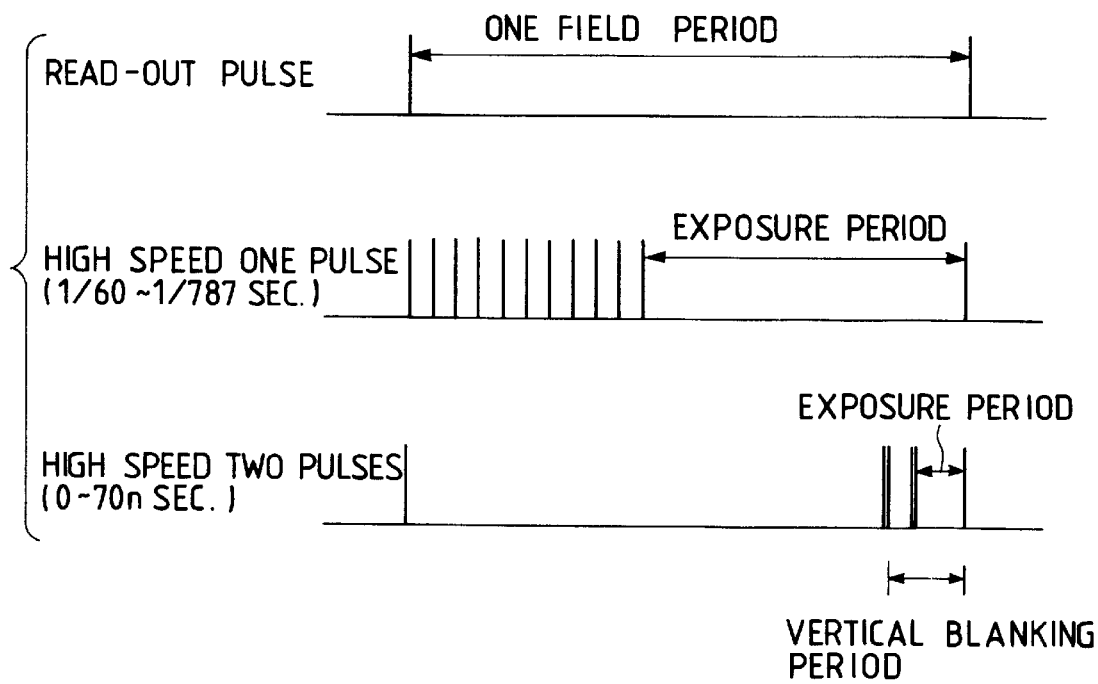
FIGS. 5A and 5B are charts showing the function of an electronic shutter.
Figure 5B:
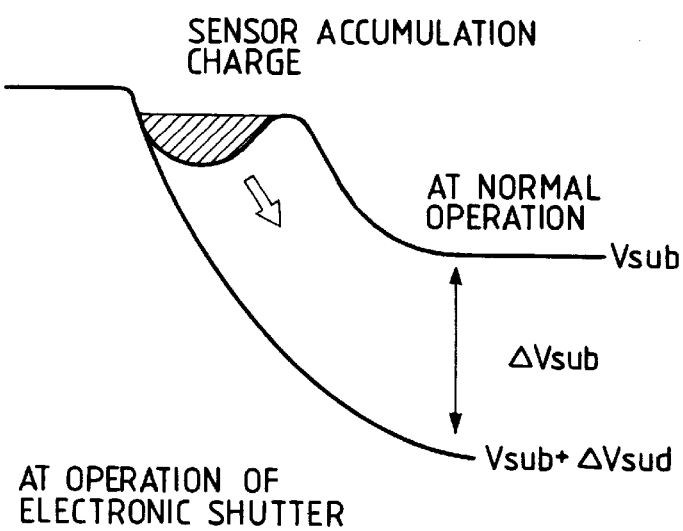

(2) Shutter Speed (Parameter 2) (cf. FIGS. 5A and 5B)

The system control circuit 25 releases an accumulation time setting sigital signal Dt, in response to which the CCD drive circuit 12 generates pulses determining the various timings of the CCD, thereby controlling the accumulation time of the photo-sensor device.

The method and range of setting of said accumulation time vary significantly, depending on the structure of the CCD constituting the photo-sensor device. In the present embodiment, there will be employed a CCD with a structure for discharging unnecessary charges in an overflow drain (OFD) in the H-blanking period.

FIGS. 5A is given for explaining the function of said CCD. The accumulation time at the high-speed side can be selected within the H-blanking period, as long as the image quality such as the phototaking light amount or the smear permits. Practically, the shortest time is about 1/10000 sec. At the low-speed side, the accumulation time can be selected, in case of NTSC standard, with a step of the H-blanking period (ca. 63.5 μsec.), down to 1/60 sec.

The shutter speed T is determined by the following calculation, based on the signal Dt released from the system control circuit 25:

1) $T_{NTSC} \cong (262.5 - Dt) \times 63.5$ μsec.
2) $T_{PAL} \cong (312.5 - Dt) \times 64.0$ μsec.

Receiving the instruction in this manner, the CCD drive circuit 12 adds a voltage $\Delta V_{sub}$ to the vertical substrate voltage $V_{sub}$, thereby varying the potential distribution in the charge accumulating portion and discharging unnecessary charge to the substrate. In this manner an arbitrary shutter speed can be attained. FIG. 5B shows this operation.

If the current shutter speed is shorter than the control value defined by the LUT 19 corresponding to the integrated value from the A/D converter 11, the system control circuit 25 varies the signal Dt to a smaller value in order to prolongate the shutter time. On the other hand, if said current shutter speed is longer than said control value, the signal Dt is made larger to increase the shutter speed.

(3) Gain (Parameter P3)

The D/A converter 21 releases a gain setting signal for determining the gain for the image signal, for supply to the AGC circuit 5.

The automatic gain control is provided, by the AGC amplifier, in order that the output signal of the CDS 4 can be properly processed in the camera signal processing circuit 6. It has been regarded as a part of the automatic exposure control loop by the iris, and has not been an independently controllable factor.

However, with the recent improvement in the S/N ratio of CCD, the settable range of gain has been expanded, as the noises of the image pickup system have become less conspicuous even when the gain in AGC is selected large.

The gain is a parameter of fast response in the image pickup system, and is therefore suitable for automatic exposure control in a situation where a rapid response is required.

If the current gain of AGC is larger than the control value defined by the LUT 19 corresponding to the integrated value from the A/D converter 11, the system control circuit 25 reduces the set value of the gain for AGC. On the other hand, if the current gain is smaller than said control value, the set value of gain is renewed to a larger value.

The present invention enables to maintain the image pickup system at a proper exposure state, employing the above-mentioned three parameters, according to the phototaking situation and mode, and the exposure control relying on each of said parameters will be explained in the following. At first there will be explained the setting of photometry areas in the image frame, depending on the different exposure control modes.

The object taken by the video camera varies in different manners, depending on the location, situation and other phototaking conditions. Therefore, in order to constantly achieve optimum automatic exposure control in such varying phototaking conditions, it is necessary to suitably vary the position of the photometry area in the image frame and the weighting of such light metering area according to the situation.

For this reason there is required an automatic phototaking mode capable of estimating the luminance distribution in the image frame in consideration of the state of illumination in the predetermined representative scene, and setting the light metering area in such a manner that a large automatic exposure calculating coefficient is assigned to an area which provides effective information for the determination of the exposure.

In the present embodiment, the image frame is divided vertically into 4 sections and horizontally into 6 sections, or, into 24 areas, which are numbered from 1 to 24 for the purpose of explanation.

Such area division is controlled by the system control circuit 25. More specifically, the gate circuit 9 is opened and closed by the gate pulses released from the system control circuit 25, whereby the output of the AGC circuit 5 is extracted for each of the areas 1–24 and is independently integrated by the integrator 10 for each area. The integrated result is converted into a digital signal by the A/D converter 11 and is then fetched by the system control circuit 25. The system control circuit 25 processes the integrated values of these areas, with the weighting coefficients predetermined corresponding to the aforementioned phototaking mode. The processing can be conducted in time-divided manner corresponding to said 24 areas.

FIGS. 7 and 8 illustrate examples of the weighting coefficients in the image frame.

FIG. 7 shows the aforementioned "center weighted light metering" applied to the 24-area automatic exposure in the present invention, wherein the automatic exposure control with the priority in the central area is achieved by assigning a weighting coefficient of 1.0 to the central areas 8–11 and 14–17, and a weighting coefficient of 0.5 to the peripheral areas. More specifically, said weighting can be reflected in the control of the iris, shutter speed and gain, by effecting said control based on the sum of the weighted integrated values of the areas.

FIG. 8 shows an example of the light metering areas suitable for "landscape phototaking". In landscape phototaking, the ground and the sky are generally included in the image frame at the same time, and the sky is usually much higher in luminance than the ground, even in somewhat cloudy weather. For this reason, in the conventional automatic exposure control without consideration of the photometry area, a person or other object in front of the sky or the ground often appears quite dark because of underexposure.

In the present example, in order to avoid such drawback, the uppermost areas 1–6 corresponding to the sky in the image frame are practically disregarded by the assignment of a coefficient 0.0, while, in the central areas of the image frame, the upper part areas are given a coefficient of 0.5 and the lower part areas are given a coefficient of 1.0. Such assignment of the weighting coefficients enables the automatic exposure calculation with larger weight in the lower areas corresponding to the ground portion.

In addition to the two examples explained above, there may be provided other phototaking modes corresponding to various phototaking situations, and various automatic exposure characteristics can be realized by selecting these modes suitable to the photometry area setting and photographing condition described later.

In the following there will be explained the actual automatic exposure control employing the above-mentioned three parameters. As explained in the foregoing, the conventional iris control is unable to cope with the various phototaking situations. For this reason, the present invention employs a larger number of parameters which are controlled in the optimum manner.

More specifically, the present invention provides a phototaking control method, called "program modes", which estimates certain representative phototaking situations and enables the phototaking operation in each of such situations, with automatic adjustments to the optimum conditions for such situation.

These program modes can be arbitrarily selected by key operations on the operation unit 20.

In order to constantly achieve satisfactory phototaking operation in various locations and under various situations, there have to be prepared plural exposure control modes which allow to provide a representative setting corresponding to the phototaking situation and to optimize the conditions under such setting.

In order to meet this requirement, there are provided at least two look-up tables (LUT) storing control functions for the control with plural parameters. As shown in FIG. 3, there are prepared two look-up tables 19a, 19b (number of tables being increased or decreased according to the number of phototaking modes; another embodiment explained later has LUT's 19a, 19b, 19c, ... ) in a memory such as a ROM, and said look-up tables are rendered selectively readable by the system control circuit 25, according to the selection made by a key operation in the operation unit 20.

Figure 9:
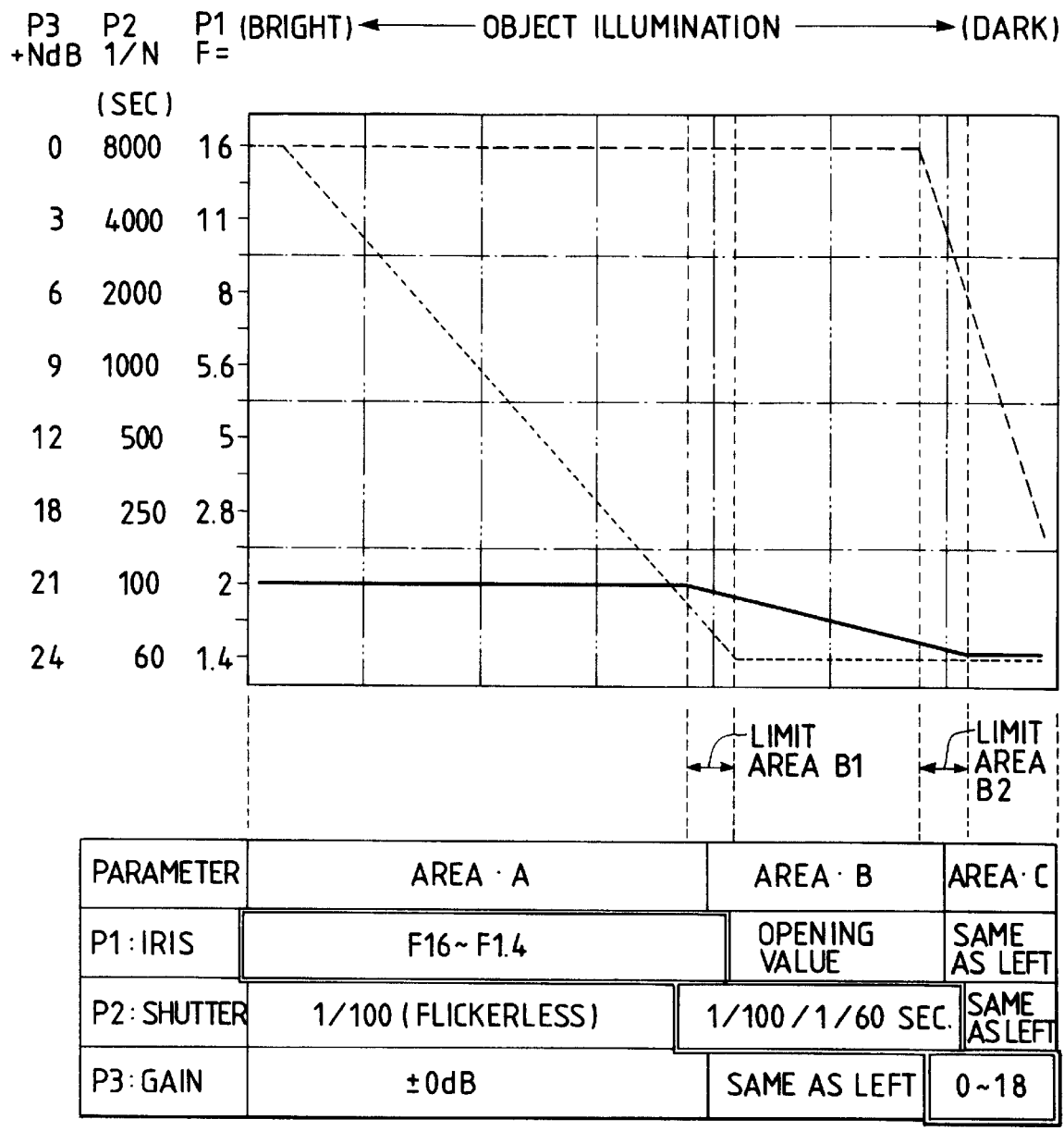
FIG. 9 is a program chart showing the parameter processing according to a phototaking mode in the present invention.
Figure 10:
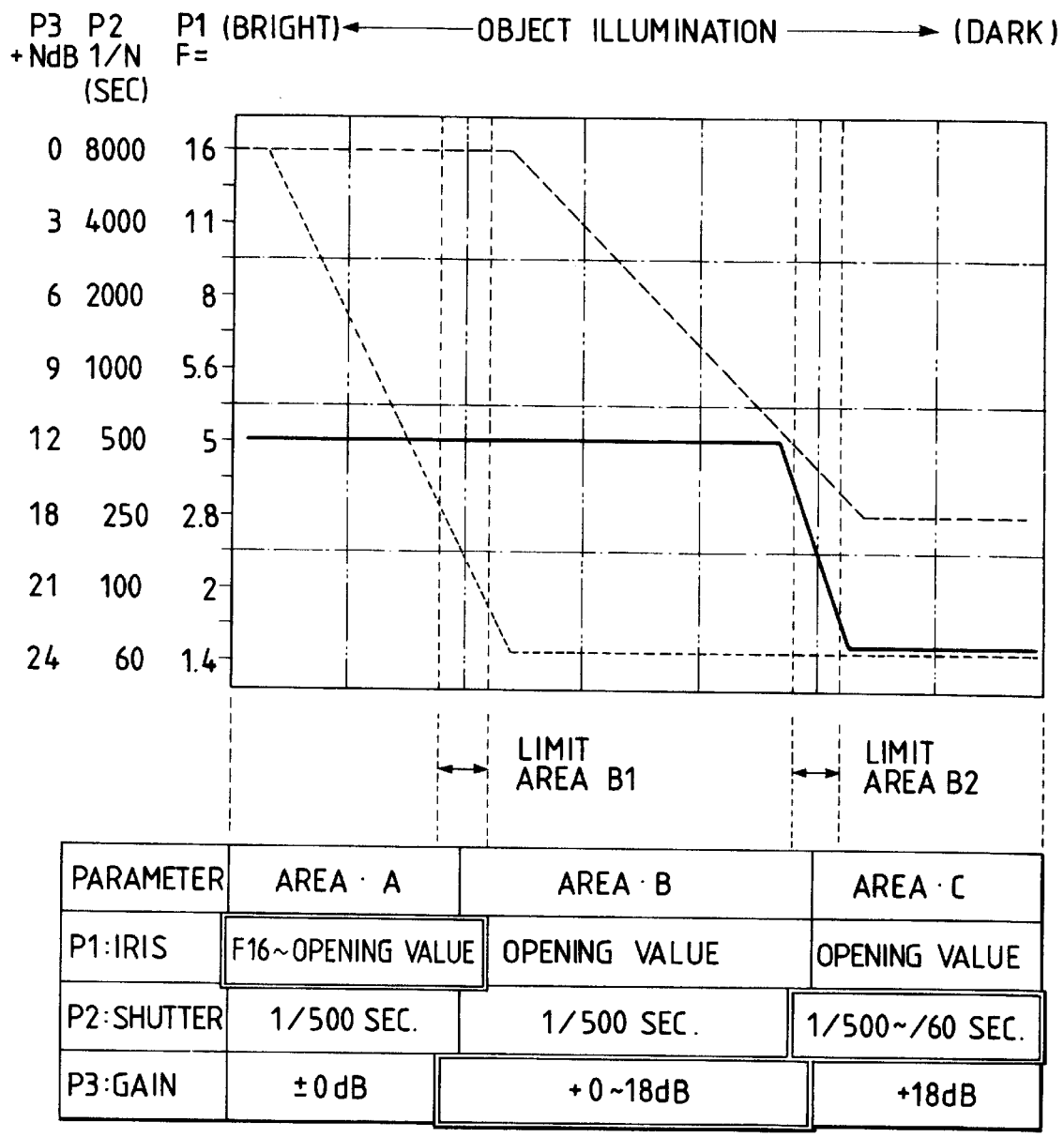
FIG. 10 is a program chart showing the parameter processing in another phototaking mode of the present invention.

FIGS. 9 and 10 show examples of the control characteristics of the parameters controlled by the data read from the LUT 19a or 19b.

FIG. 9 is a program chart of a program control, stored for example in the LUT 19a, in which the shutter speed of the parameter (2) is maintained at 1/100 sec. as long as possible, and the exposure control for the change of the luminance information constituting the input parameter is achieved by varying the iris aperture constituting the parameter (1) or the gain of AGC constituting the parameter (3).

This program is to suppress the flicker of the fluorescent lamp, encountered when a video camera of NTSC system is used in a region with a commercial electric frequency of 50 Hz, and can therefore be called "indoor" mode.

In FIG. 9, the abscissa indicates the illumination intensity of object constituting the input parameter, while the ordinate indicates the set values of the control parameters. As will be apparent from FIG. 9, the set range of each parameter is divided into three areas A, B, C according to the input parameter or the illumination intensity, and the exposure control is achieved by the combination of three parameters in each area.

In the area A, the shutter speed (P2) is fixed at 1/100 sec., while the gain (P3) is also fixed, and the exposure control is achieved by controlling the iris aperture (P1) according to the illumination intensity. This area A can cover most of the objects.

The area B corresponds to a state in which the iris is fully opened because of the low illumination intensity, so that the iris aperture is fixed at the largest aperture. The exposure control is therefore conducted by varying the shutter speed to 1/60 sec. which is the basic functioning time of NTSC system, in which the charge accumulation and signal readout are conducted at a cycle of 1/60 sec.

In the area C of an even lower illumination intensity, the exposure control is achieved by elevating the gain (P3), since the iris aperture and the shutter speed are already at their limits.

In this manner the optimum exposure control matching the phototaking situation can be speed to 1/60 sec. which is the basic functioning time of NTSC system, in which the charge accumulation and signal readout are conducted at a cycle of 1/60 sec.

In the area C of an even lower illumination intensity, the exposure control is achieved by elevating the gain (P3), since the iris aperture and the shutter speed are already at their limits.

In this manner the optimum exposure control matching the phototaking situation can be achieved by varying the control parameters P1–P3 according to the change in the input parameter indicating the illumination intensity of the object.

FIG. 10 shows a program chart of another program mode stored for example in the LUT 19b, in which the shutter speed (P2) is maintained at 1/500 sec. so far as possible, in order to provide a sharp image without blur even for a fast-moving object, this mode will be called "sports mode".

As shown in FIG. 10, the shutter speed in the areas A and B is maintained at 1/500 sec. so far as possible, and the exposure control is achieved by varying the iris aperture (P1) and the gain (P3) in response to the change in the illumination intensity, and the shutter speed is gradually varied to 1/60 sec. only in the area C in which the high shutter speed cannot be maintained due to the decreased illumination intensity.

Figure 11:
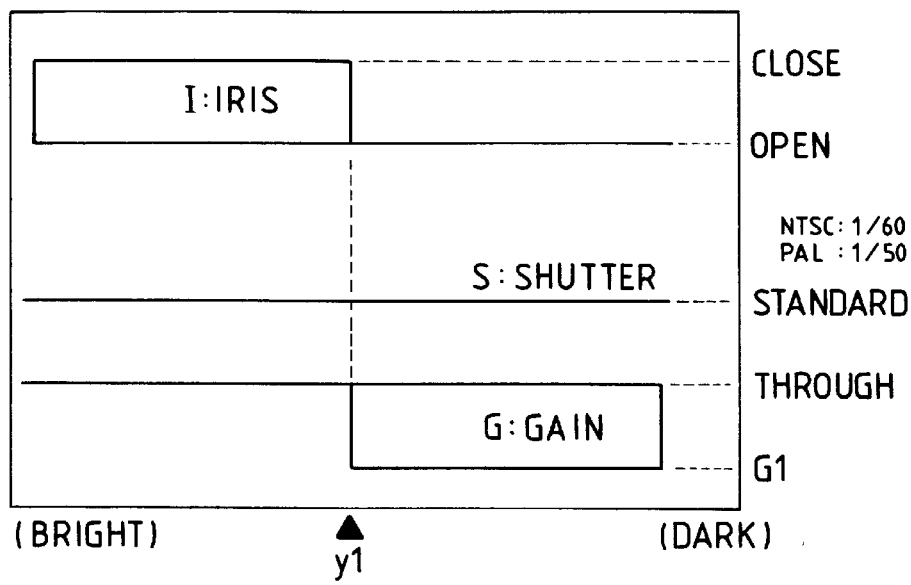
FIG. 11 is a program chart showing the parameter processing in still another phototaking mode of the present invention.

FIG. 11 is a program chart in the aforementioned "landscape" mode shown in FIG. 8. Although the actual program chart resembles FIG. 7 or 8, FIG. 11 shows the operating ranges of the iris aperture, shutter speed and gain, in the order from above, for the purpose of simplicity.

In FIG. 11, I indicates the iris aperture controlling parameter (P1), S indicates the shutter speed controlling parameter (P2), and G indicates the gain controlling parameter (P3). As indicated at the right hand side of the chart, the iris aperture controlling parameter (P1) varies between a closed state and an open state. The shutter speed controlling parameter (P2) is maintained constant, and the gain controlling parameter (P3) varies between a gain 1 (±0 dB; indicated as "through" because the input signal is let to pass through without change) and a predetermined value G1. Each parameter in its variable range varies its value according to the change in the luminance level constituting the input parameter, in a similar manner as in FIGS. 9 and 10.

In the landscape mode, since flicker or fast-moving objects are generally absent, the shutter speed (P2) is fixed at 1/60 sec., the control is mainly conducted by the iris aperture (P1), and then by the gain (P3) after the iris is fully opened.

As shown in FIG. 11, the control range of the parameters is divided into two areas, at an object luminance y1. The shutter speed (P2) is fixed at 1/60 sec. regardless of the object luminance constituting the input parameter. Until the luminance is reduced to y1, the gain (P3) of AGC is fixed at ±0 dB, and he control is executed solely by the iris aperture (P1). After the iris is fully opened at the luminance y1, the exposure control is achieved by varying the gain of AGC.

Thus, an optimum exposure control can be attained in any phototaking situation, by preparing plural program modes matching various phototaking situations and suitably selecting one of said modes by the key operation on the operation unit 20.

At the switching of the program mode by the operation unit 20, the setting of the aforementioned light metering area in the image frame is simultaneously switched in linkage. For example, in the indoor mode shown in FIG. 9 or in the sports mode shown in FIG. 10, the center weighted light metering shown in FIG. 7 is employed since the object such as a person is usually positioned at the center of the image frame.

Also when the phototaking mode is switched to the landscape mode shown in FIG. 11, the light metering area is simultaneously switched to the one for landscape taking shown in FIG. 8.

The controls of the parameters in the above-explained program charts have following features.

As will be apparent from FIGS. 9 and 10, the set range of the control parameters is divided into plural areas (three areas A, B and C in the present embodiment), and one of said areas is selected according to the change in the input parameter, or the illumination intensity of the object. In each area, only one parameter is rendered variable for use in the automatic exposure control, while other two parameters are fixed, as represented in a table below the program chart.

Referring to FIG. 9, in the area A, the parameter P1 is variable while other parameters are fixed. Thus, the shutter speed and the gain are fixed while the control is conducted with the iris aperture.

In the area B, the parameter P2, or the shutter speed, is variable, while other parameters are fixed. In the area C, the parameter P3, or the gain is variable, while other parameters are fixed.

Consequently, although the control is conducted by varying three control parameters, the variable parameter is always only one in each area. Thus the calculation can be dispensed with for the fixed parameters, and the amount of calculation is same as that in the conventional single-parameter control.

Thus the present invention simplifies the calculation, which becomes inevitably complex by the increase of control parameters for covering all the phototaking situations, by dividing the set range of said parameters into plural areas and rendering only one parameter variable while fixing other parameters in each area. In this manner the handling of complex phototaking conditions and of plural control parameters can be simplified, and the optimum automatic exposure control can be attained without the use of large-scale logic circuits or computer.

The present invention is further provided with another feature in the switching of the above-mentioned control parameters.

As explained in the foregoing, the present invention reduces the amount of calculation by varying only one parameter and fixing other parameters, but a particular condition specific to video camera is that the object of phototaking is a moving image of which phototaking conditions are varying constantly.

In determining the control parameters in response to the input parameter as explained before, the control of the system can be simplified by limiting the control to only one parameter, but the value of the input parameter may vary among plural divided areas as a result of changes in the phototaking conditions. In such case there will result a switching of the controlled parameters, but the manner of change of the image may be significantly different depending on the involved parameter, and the obtained image will become uncomfortable if such switching occurs frequently.

As a countermeasure for such drawback, it is conceivable to create hysteresis in the transition between the areas, thereby reducing the frequency of transitions between the areas, but such method cannot be a basic solution as it is effectless once the switching has taken place.

In the present invention, as the countermeasure, two parameters of the adjacent areas are simultaneously varied in the vicinity of the boundary of said areas, as shown in FIGS. 9 and 10.

In FIG. 9, the parameters P1 and P2 are varied simultaneously in a boundary region B1 defined by broken lines, and the parameters P2 and P3 are varied simultaneously in a boundary region B2.

Such simultaneous change of two parameters causes the image changes specific to these parameters in simultaneous and gradual manner, so that the change in the image becomes visually natural even in case the transition of parameters occurs between the different areas.

FIG. 12 is a flow chart showing the parameter setting sequence, including the above-mentioned parameter processing at the boundary region of the areas, in a program mode based on the program chart shown in FIG. 9.

When the control sequence is started, a step S1 monitors the start of power supply, and when the power supply is started, a step S2 confirms the phototaking program mode (M) selected by the operation unit 20. Then a step S3 sets the designated program characteristics, by referring to the LUT 19a or 19b corresponding to the selected program mode (M).

A step S4 reads, from the designated LUT, the data relating to the weighting of 24 areas formed on the image frame, and effects the weighting corresponding to the phototaking mode.

A step S5 confirms the current area on the reference parameter axis, namely the illumination intensity of the object.

Then a step S6 determines the branch of the sequence according to the current area.

When the area A is confirmed, the sequence proceeds to a step S7 for calculating the iris aperture controlling parameter P1, when a step S8 discriminates whether the current position is inside the boundary region B1, and, if outside said boundary region B1, the sequence proceeds to a step S9 for fixing the shutter speed controlling parameter P2 at the previous value, but, if inside said boundary region B1, the sequence proceeds to a step S10 for calculating the shutter speed controlling parameter P2 anew and then to a step S20 for fixing the gain controlling parameter P3 at the previous value, and finally to a step S23.

When the area B is confirmed in the step S5, a step S11 calculates the shutter speed controlling parameter P2, and a step S12 discriminates whether the current position is inside the boundary region B1 or B2. If inside the boundary region B1, a step S13 calculates the iris aperture controlling parameter P1, then a step S20 fixes the gain controlling parameter P3 at the previous value, and the sequence proceeds to the step S23.

If inside the boundary region B2, a step S15 calculates the gain controlling parameter P3, then a step S22 fixes the iris aperture controlling parameter P1 at the previous value, and the sequence proceeds to the step S23.

If the current position does not belong either to B1 or B2, a step S14 fixed the iris aperture controlling parameter P1 at the previous value, then a step S21 fixed the gain controlling parameter P3 at the previous value, and the sequence proceeds to the step S23.

When the area C is confirmed in the step S6, a step S16 calculates the gain controlling parameter P3, and a step S17 discriminates whether the current position is inside the boundary region B2. If outside the boundary region B2, a step S19 fixes the shutter speed controlling parameter P2 at the previous value, but, if inside the boundary region B2, a step S18 calculates the shutter speed controlling parameter P2, then a step S22 fixed the iris aperture controlling parameter P1 at the previous value, and the sequence proceeds to the step S23.

The step S23 causes the system control circuit 25 to release the parameters P1, P2, P3 determined in the above-explained sequence, thereby controlling the iris 2, the photosensor device 3 and the AGC circuit according to the program mode, and a next step S24 waits until the next processing time arrives (in the present embodiment, the basic unit consists of one calculation per frame). Then a step S25 discriminates whether the power supply has been turned off, and, if the power supply is continued, the sequence returns to the step S1 to repeat the above-explained process, but, if the power supply has been turned off, the sequence is terminated.

In this manner the various parameters can be controlled in each selected program mode, and the exposure control is achieved on said parameters. Besides the automatic exposure control can be constantly conducted in optimum manner according to respective phototaking situation, as the light-metering area in the image frame is switched, in linkage with the switching of the program mode, to one suited to the phototaking situation.

Also the switching of control mode can be made in optimum manner, as the phototaking state of the camera does not show an unnatural change in case of change in the phototaking situation.

Also the calculation for exposure control can be reduced in magnitude and made faster, since only one parameter is rendered variable while other parameters are fixed in each of the areas of a reference parameter, divided according to the phototaking condition.

Furthermore the order of priority is defined for the plural control parameters, and, though only one parameter is controlled in each area of the reference parameter, two parameters of the adjacent two areas can be simultaneously controlled at the transition between said two areas, whereby the switching of the parameters can be achieved without unnatural change in the image. It is therefore rendered possible to reduce the change of the image itself, which could not be avoided even with the conventional hysteresis method.

Furthermore, there is provided an advantage of improved mass producibility, since there can be reduced the change in image, resulting from the difference in the threshold values of luminance areas, caused by eventual fluctuation among the respective products.

As explained in the foregoing, the image pickup device of the present invention enables more delicate control than in the conventional devices and allows optimum phototaking operation even in varied phototaking conditions, merely through the selection of the phototaking mode, since the phototaking status is controlled with plural parameters while plural phototaking program modes are rendered selectable according to the various phototaking situations, and the light metering area is also switched in linkage with the mode switching, so as to match the selected mode.

Figure 13:
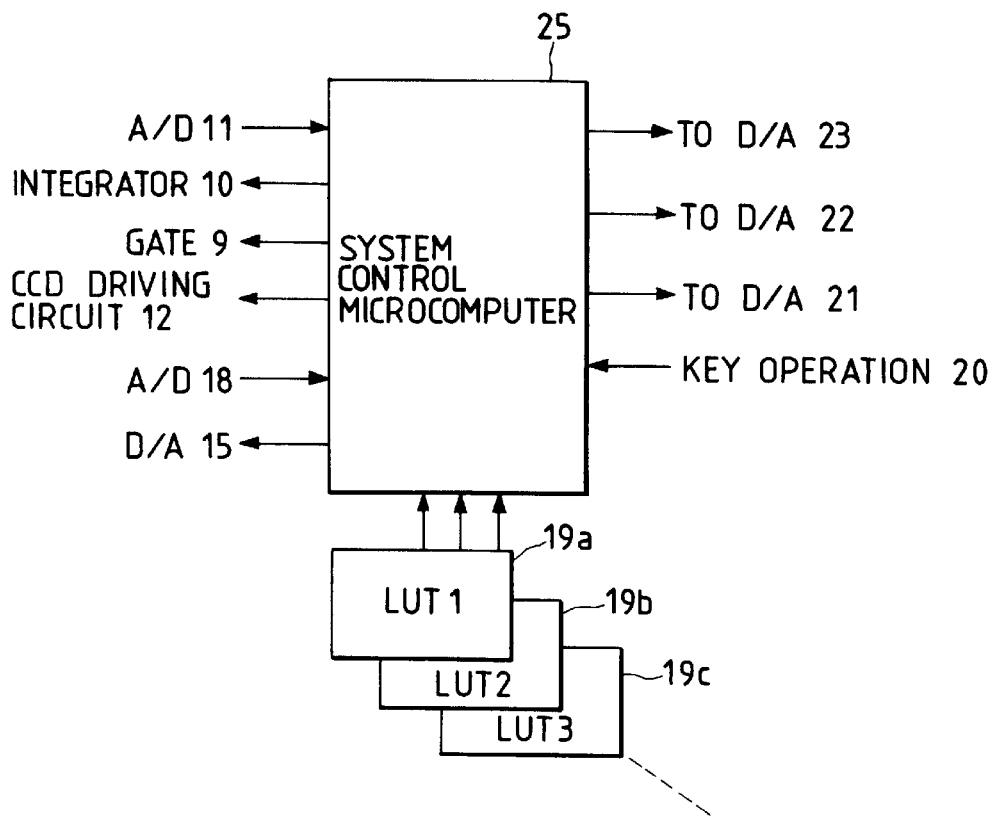
FIG. 13 is a block diagram showing another embodiment of the image pickup device of the present invention.

In the following there will be given detailed explanation on the actual phototaking modes. There are provided, for example, "indoor mode", "sports mode", "landscape mode", "portrait mode", "spot mode", "full auto mode" etc., and the look-up tables storing the data of these modes increase in number, as shown in FIG. 13, corresponding to the increase of the control modes. FIG. 13 shows the connection between the system control circuit 25 and the look-up tables 19a, 19b, 10c, . . . , and the remaining configuration is identical with that shown in FIG. 3.

Said look-up tables store information on the control characteristics of the exposure controlling parameters such as the iris aperture, shutter speed and gain, corresponding respectively to the plural phototaking modes, and the necessary data can be read according to the selected phototaking mode.

In the foregoing there has been explained the method of controlling the exposure with plural program modes. In the present embodiment, at the switching of said program modes, the system control circuit 25 can supply, through the D/A converters 22, 23, control signals for varying the characteristics of image processing and camera signal processing from the standard state according to the respectively phototaking situation.

In order to represent the scenes constantly in optimum manner under various phototaking situations and conditions, it is also effective, in addition to the control by the basic control parameter at phototaking, to effect control on the camera signal processing circuit 6, image signal processing circuit 7 etc. shown in FIG. 3.

Figure 15:
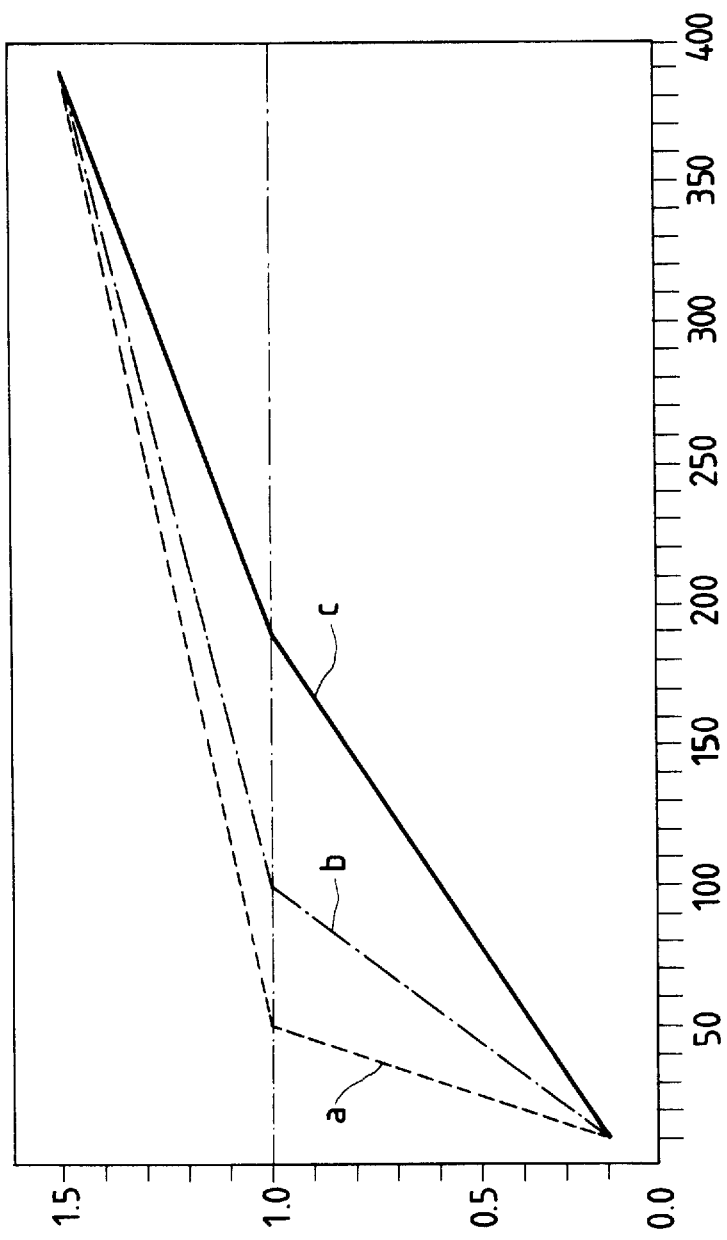
FIG. 15 is a chart showing the characteristic of a camera signal processing circuit, in relation to the switching of the phototaking mode in the present invention.

More specifically, it is conceivable, in consideration of the taken image corresponding to the selected representative scene and in response to the selected phototaking mode, to vary the non-linear conversion characteristic of the image signal level (knee characteristic or gamma characteristic) in the camera signal processing circuit 6, shown in FIG. 3, in a manner as indicated by a, b and c in FIG. 15, also to control the characteristics of an aperture correction circuit for varying the image sharpness, and to add "fading effect" or "afterimage effect" to the image signal in the image signal processing circuit 7 as an additional image effect.

Figure 16:
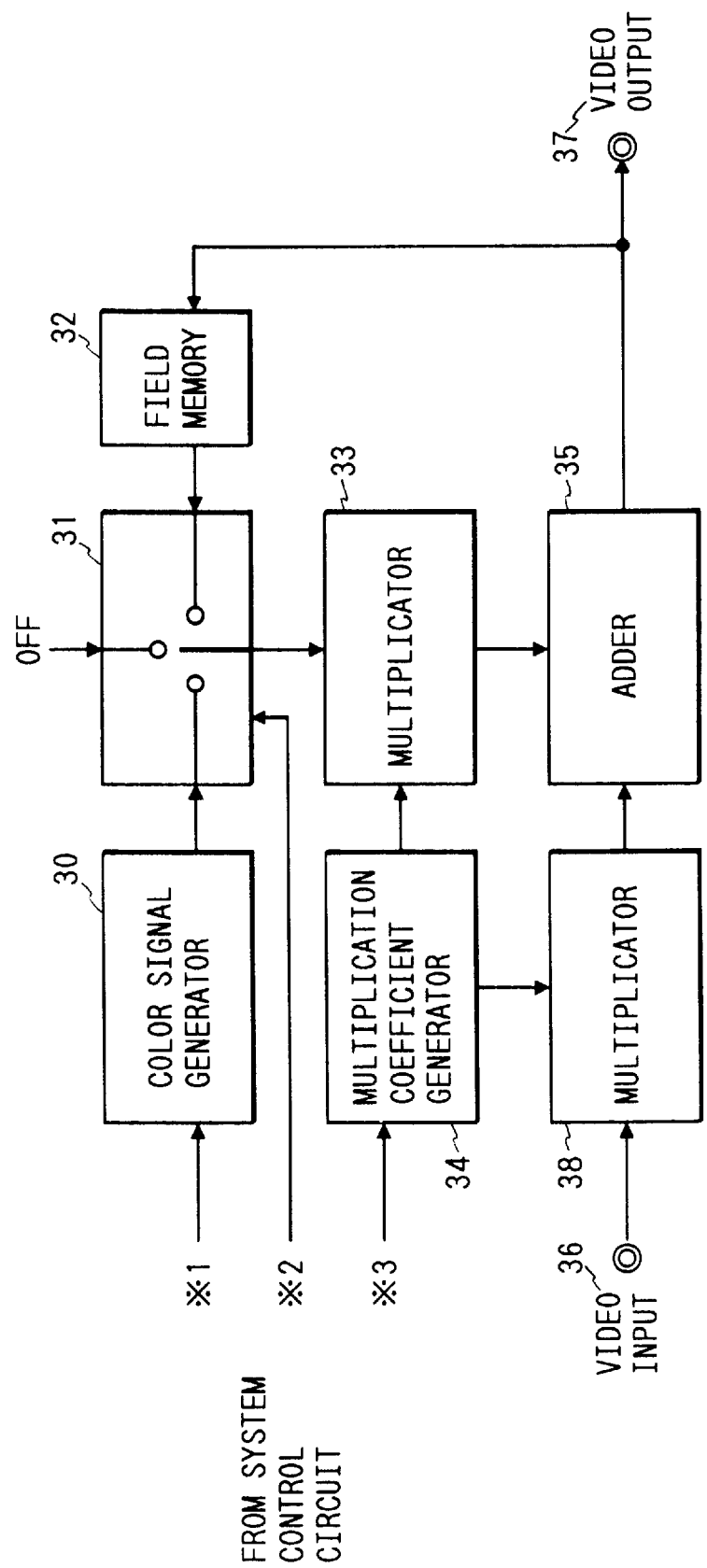
FIG. 16 is a block diagram, showing the control for the image processing circuit, in relation to the switching of the phototaking mode in the present invention.

FIG. 16 shows the configuration of the image signal processing circuit 6 capable of realizing such additional effects, and the structure and function of said circuit will be explained in the following.

A color signal processing circuit 30 generates a color signal (for example a totally blue signal constituting blue background or a totally white signal) designated by a control signal X1 from the system control circuit 25, and said color signal is supplied to a selector signal 31 for selecting said color signal, an image output signal delayed by a field by a field memory circuit 32, or a signalless state.

Said selector switch 31 supplies the input terminal of a multiplier 33 with one of three information, selected according to an instruction X2 from the system control circuit 25. The multiplier 3 effects a multiplication with a coefficient released by a multiplication coefficient generator 34 according to an instruction X3 from the system control circuit 25. The result of said multiplication is added, by an adder 35, to the result of similar multiplication on, conducted by a multiplier 38, on the image input signal from an input terminal 36, and the result of addition is supplied to an output terminal 37.

In such signal processing, if the selector switch selects the signalless OFF terminal, the adder 35 only receives the image signal from the input terminal 36, and said image input signal is passed through to the output terminal 37. In this state, the multiplier 38 has a coefficient 1.0.

When the selector switch 31 selects the output of the color signal generator 30, calculation is conducted with the output of the multiplication coefficient generator 34, according to the instruction (start/end timing or direct coefficient setting) of the system control circuit 25, in such a manner that one of the input image signal from the input terminal 36 and the output of the color signal generator 30 increases from 0 to 1 while the other decreases from 1 to 0 (coefficients being mutually complementary with a sum 1), whereby the color signal and the image signal effect mutial replacement. Visually, the image varies gradually from a blue image frame to a moving image.

Also in case the output of the field memory is selected, the coefficient of the multiplier 38 is the compliment to 1, as explained above, but the coefficients in this case are not variable but are fixed for example at 0.5.

In this case, the result of addition is cyclically added with a predetermined proportion and with the delay of a field, so that the input image appears trailing in the direction of time axis.

Thus, image quality control can be achieved by effecting such signal processing for example in the portrait mode principally for taking the image of a person, and by giving a soft feeling to the image through a change in the aperture characteristic in the camera signal processing circuit, so as to reduce the response in a frequency range relating to the human visual sharpness, or a frequency range of 2–3 MHz in the television signal.

Also the circuit shown in FIG. 16 can automatically provide special image processings, such as color fading of the image.

The portrait mode employs the center weighted photometry, with the weighting of the photometry area shown in FIG. 7, and its program chart is shown in FIG. 17, in which the working ranges for the iris aperture, shutter speed and gain are simply shown from above, though the actual program chart is designed as shown in FIG. 9 or 10.

In FIG. 17, I indicates the iris aperture controlling parameter P1, S indicates the shutter speed controlling parameter P2, and G indicates the gain controlling parameter P3. As indicated at the right-hand side of the chart, the iris aperture controlling parameter P1 varies between a closed state and an open state; the shutter speed controlling parameter P2 varies between a high speed T1 and a standard speed of 1/60 sec.; and the gain controlling parameter P3 varies between a gain 1 of ±0 dB (wherein the input signal is passed through) and a predetermined value G1.

In respective variable range, each parameter varies its value according to the luminance level constituting the input parameter, as shown in FIG. 9 or 10.

This portrait mode, designed for a person as the object, gives emphasis on a phototaking operation with a shallow depth of focus.

As shown in FIG. 17, the object luminance on the abscissa is divided into three areas, with two threshold values y1, y2.

In the high luminance area A, the control is effected by the iris aperture. In order to secure a high S/N ratio at the high luminance, the gain of AGC is maintained at ±0 dB until the iris reaches the fully open state, and the iris aperture control is conducted in consideration of the deterioration in the resolving power resulting from diffraction phenomenon by a small aperture of the iris.

More specifically, the iris is fully opened when the luminance level does not exceed y1. Therefore, at an ordinary luminance, the iris is fully opened to maintain the depth of focus smallest. Thus the iris aperture is controlled in two areas, namely a variable area and a fully open area, separated by the threshold value y1.

The shutter speed in the high luminance area above y1 is set at a high speed T1, shorter than the standard 1/60 sec., in order to reduce the depth of focus even at a high luminance and to avoid the small iris aperture. In practice said shutter speed is selected within a range of 1/250–1/4000 sec.

Also such shutter speed enables control without increase in the gain of AGC even at a low luminance, thereby improving the S/N ratio.

In an area between y1 and y2, the iris is fully opened, and the exposure control is achieved by varying the shutter speed between said T1 and the standard speed of 1/60 sec., as the gain of AGC is preferably maintained low in consideration of the S/N ratio.

When the luminance is lower than y2, the shutter speed is set at 1/60 sec. which is the standard value for the NTSC television signal.

In this state the exposure control is conducted by varying the gain of AGC within the permissible range of S/N ratio.

The gain is always fixed at ±0 dB so that the AGC circuit 5 does not have an amplifying effect at the luminance of y2 or higher as explained above, and, since the area above y2 covers most of the object luminance, image with satisfactory S/N ratio can always be obtained.

The gain is only controlled when the luminance level becomes lower than y2, and the exposure control is achieved by increasing the gain within the permissible range of S/N ratio.

As explained in the foregoing, the portrait mode is based on the center weighted photometry, and the above-mentioned image quality control or image processing can be effectively utilized in combination, as the object in this mode is principally a person.

In the foregoing there have been given basic explanation on the setting of control parameters in different phototaking modes, the setting of the photometry area in each phototaking mode, and the switching of characteristics of the signal processing system in each phototaking mode.

In the following there will be explained the sequence of setting the control parameters such as the iris aperture, shutter speed and gain in the present embodiment.

Figures 14, 14A, 14B:
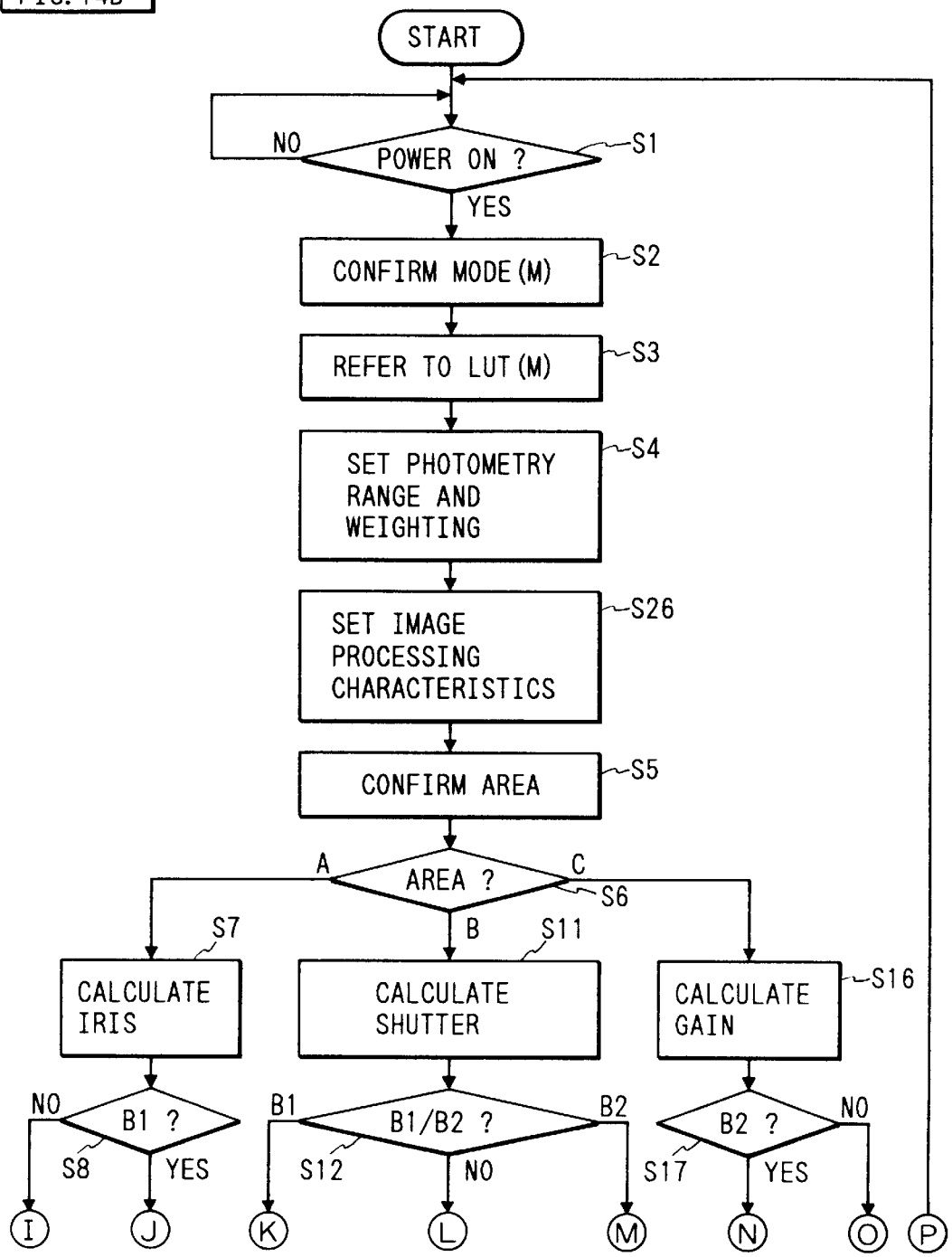
FIG. 14 is a flow chart showing the sequence of control parameter setting.
Figure 14B:
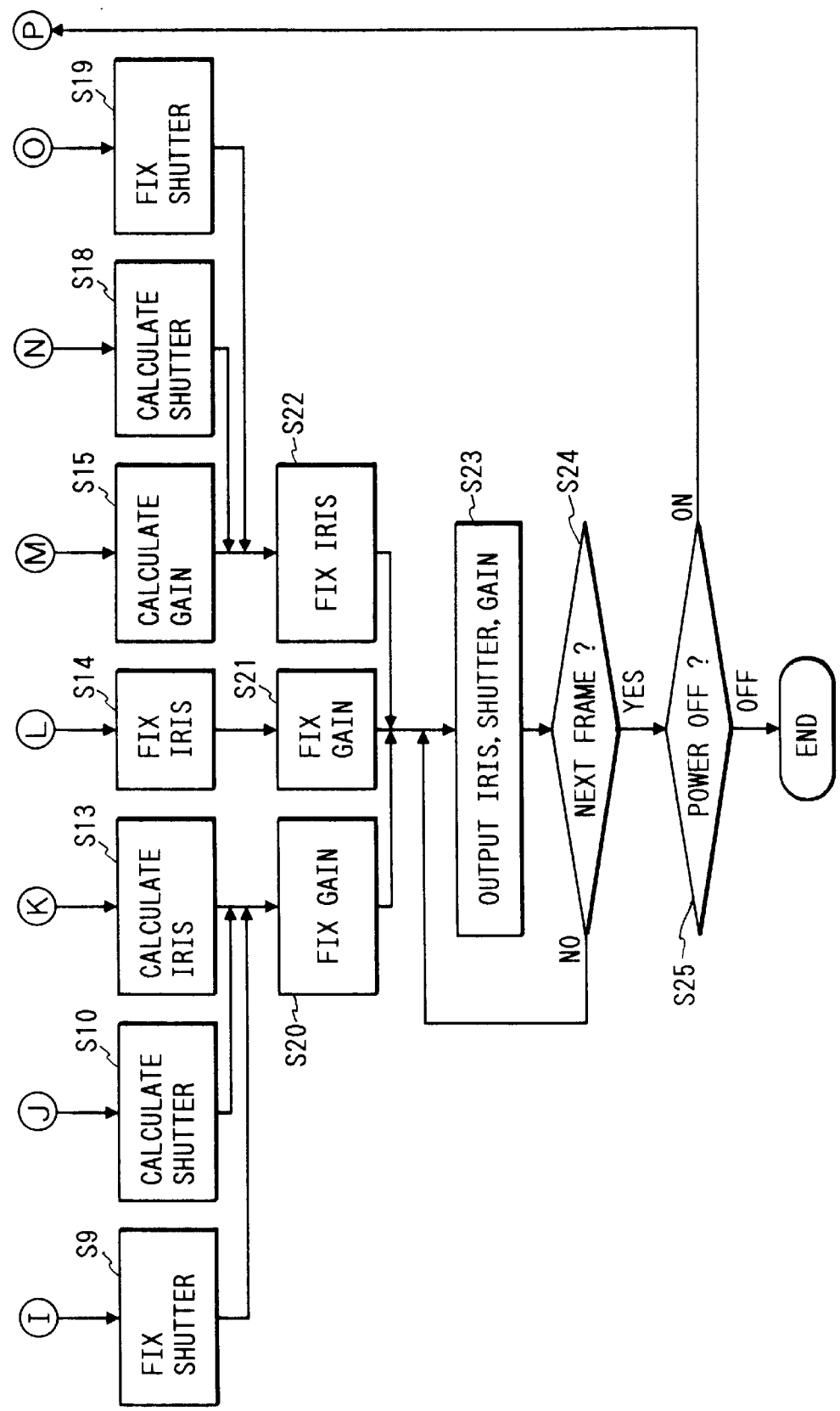

FIG. 14 is a flow chart showing the parameter setting sequence, including the parameter processing in the boundary regions of area, in the program mode corresponding to the program chart shown in FIG. 9. Said flow chart is different from that in FIG. 12 only by the presence of a step S26 for the aforementioned image processing next to the step S4 for setting the light metering area and weighting.

When the control sequence is started, a step S1 monitors the start of power supply, and, when the power supply is started, a step S2 confirms the program mode (M) selected by the operation unit 20. A next step S3 sets the desired program characteristics by referring to a LUT 19a, 19b, 19c, . . . corresponding to the selected program mode.

A next step S4 reads, from said LUT, the data concerning the weighting of 24 areas in the image frame, and effects the weighting corresponding to the selected phototaking mode, as explained above.

A next step S26 reads the content and characteristics of image processing from the LUT corresponding to the selected mode, and sets, for examples, the image quality control by iris aperture control or image processing by color fading, matching the selected phototaking mode.

A step S5 confirms the current area on the reference parameter axis, namely, namely as the function of the object luminance.

Subsequently a step S6 determines the branch of the sequence, according to the current area. The subsequence operations will not be explained as they are identical with those shown in FIG. 12.

In this manner the parameters are rendered controllable according to the selected program mode, and the exposure control is achieved, utilizing said control parameters.

In linkage with the switching of the program mode, there are also switched the photometry area in the image frame and the characteristics and additional functions of the image signal processing system, so as to match the phototaking situation. Consequently the phototaking operation can always be conducted with optimum automatic exposure control, matching the respective phototaking situation.

Besides, even in case of a change in the phototaking situation, the mode can be switched in optimum manner without unnatural change in the phototaking state of the camera.

In the following there will be explained the "spotlight mode" constituting another program mode of the present invention. There will-also be explained the setting and control of various modes, the internal structure of LUT and the control of parameters by the mode setting, taking said spotlight mode as an example.

The spotlight mode anticipates a situation in which an object of a high luminance exists in a dark background, and is suitable for taking a spotlighted object in a dark room as in a wedding banquet or a party.

In the phototaking of such spotlighted object present in a dark background, the conventional averaged light metering over the entire image frame results in an overexposure in the spotlighted main object, as the average of the light metering is governed by the low luminance area constituting a major part of the image frame.

Also the center weighted photometry cannot provide exact exposure control because the spotlighted object may not be positioned in the central part of the image frame, and, even if it is positioned in the central area of high weight, exact exposure control is not possible if the area of high luminance is small.

The "spotlight mode" of the present invention, explained in the following, is designed to enable satisfactory exposure control even in such phototaking situation.

FIG. 18 shows the internal structure of a look-up table storing the definition and characteristics of control parameters required in the control in said spotlight mode. The program chart showing the changes of control parameters set by said LUT as a function of the input luminance constituting the input parameter, is same as that for the "landscape mode" shown in FIG. 11. Consequently FIG. 11 is referred to in the following explanation, but the setting of the threshold values y1, y2 is different in these two modes.

Figure 1:
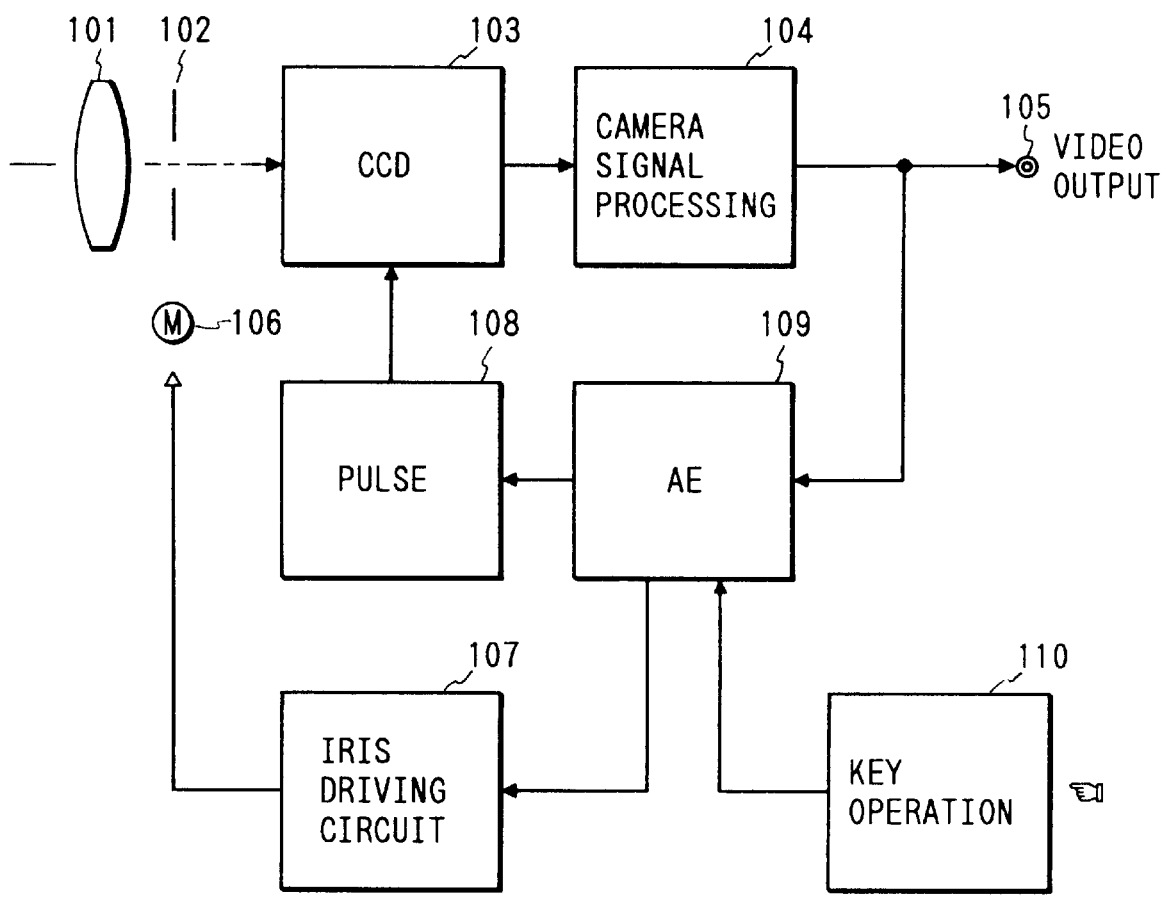
FIG. 1 is a block diagram of an ordinary image pickup device, applied as the exposure control device in a video camera.
Figure 2:
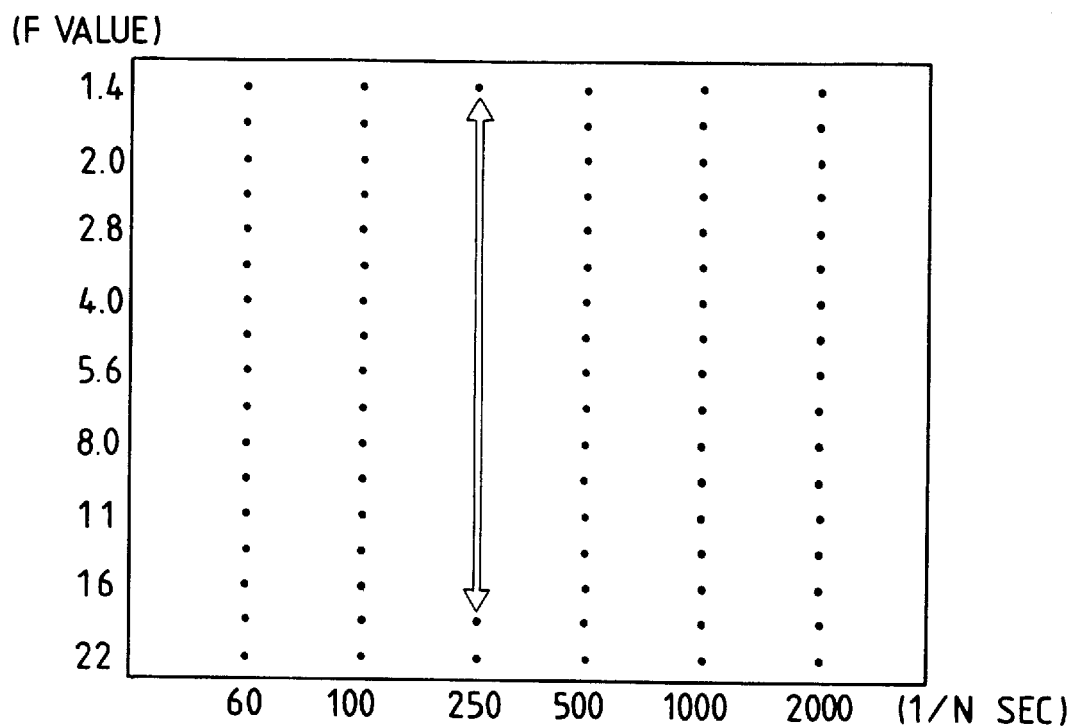
FIG. 2 is a view showing the shutter priority mode.

Referring to FIG. 1, the object luminance on the abscissa is divided into two areas by a threshold value y1, and the exposure control is executed by the iris aperture and the gain, while the shutter speed is fixed.

In the following there will be given explanation on the control parameters contained in the look-up table for the spotlight mode.

[Iris Aperture Controlling Parameter P1]

The iris aperture controlling parameter varies according to the input parameter Y or the luminance level, and is defined by a function f(y) of the input luminance.

Figure 19:
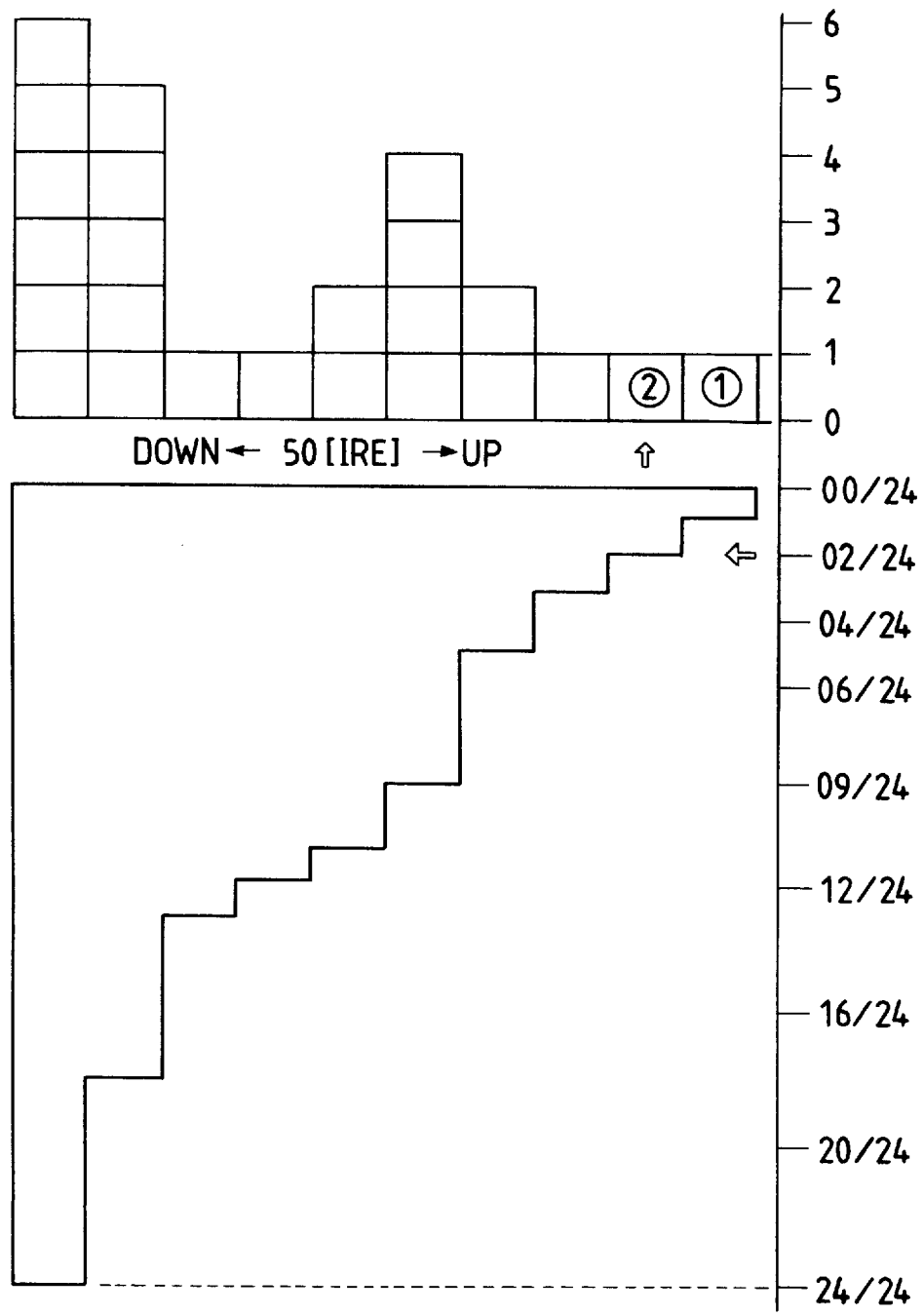
FIG. 19 is a luminance histogram for determining the light metering area corresponding to the "spotlight mode" of the present invention.

In case the input luminance is higher than the threshold value y1 shown in FIG. 19, a message [→CAL] indicates that calculation is necessary, as shown in FIG. 19.

In the high luminance area, in order to secure the S/N ratio, the gain of AGC is maintained at ±0 dB, and the iris aperture is controlled from the smallest aperture to the fully open state.

In case the input luminance level is lower than y1, a control for setting the iris at the fully open state is defined by [→OPEN].

In this area the luminance can be estimated considerably low, and if the phototaking operation is to be conducted at the sacrifice of the S/N ratio of the image, the gain of AGC is increased.

As explained above, the control characteristic for the iris aperture is defined by dividing the entire luminance range into two areas by the threshold value y1.

[Shutter Speed Controlling Parameter P2]

The shutter speed controlling parameter is fixed at a predetermined value, regardless of the input luminance level. It is fixed, as indicated by [→STANDARD], at the standard value of the television standard, and the calculation is not required.

The standard value of the television signal is 1/60 sec. in NTSC standard and 1/50 sec. in PAL standard.

[Gain of AGC P3]

The gain is defined by a function f(Y) of the input luminance, according to the threshold value y, and, if the input luminance is higher than y1, it is defined by [→±0 dB] at ±0 dB, whereby the AGC circuit does not have the amplification effect. Thus, while the exposure control is possible by the iris aperture, the gain of AGC is fixed in order to prevent deterioration in the S/N ratio. The calculation is unnecessary in this case.

As such area is designed to cover most of the object luminance, the phototaking operation with satisfactory S/N ratio can be achieved in the entire range.

In case the input luminance is lower than y1, the optimum gain is calculated as indicated by [→CAL].

In this area, the luminance is considerably low, so that the gain is increased if the phototaking operation is to be conducted at the sacrifice of the S/N ratio.

In this state, the remaining controllable parameter is only the gain of AGC, since other parameters are already set for responding to the low luminance state. Thus, the exposure control is executed by an increase of the gain in the permissible range, in consideration of the deterioration of the S/N ratio.

The three control parameters are correlated with two areas divided by the threshold value y1, as shown in FIG. 11. Also in this case, calculation in each area is required for only one parameter and can therefore be simplified. Said parameters are respectively the iris aperture and the gain, in the order from the high luminance side.

[AE Weighting Parameter (Weighting of Light Metering Area) P4]

This is a parameter defining the distribution and weighting of the photometry area in the image frame. It is a function of the input luminance, as indicated by f(Y) in FIG. 18. More specifically it is defined by a histogram prepared by the input luminance signals. A luminance histogram is prepared by detecting the input luminance signal in each of 24 areas in the image frame, and is used for exactly detecting the spotlighted area of a high luminance, and the photometry is executed principally in such area.

In the present embodiment, from the luminance histogram prepared by detecting the luminance in each of 24 areas, N (=2) areas of highest luminance are extracted, and the automatic exposure control is executed on said N areas only.

Consequently appropriate exposure can be obtained even in case of heavily localized illumination such as by a spotlight, without the influence of the dark background area where the main object is lacking.

FIG. 19 shows such histogram, in which the upper part shows a luminance histogram, wherein the abscissa indicates the IRE level, becoming higher from left to right, while the ordinate indicates the number of areas in each IRE level.

The lower half is a cumulative histogram, wherein the ordinate indicates the number of areas in 24 divided areas.

FIG. 19 also illustrates the extraction of two areas (1) and (2) of highest luminance, from said 24 divided areas.

In this manner the light metering for automatic exposure control can be achieved by detecting the high luminance areas in the image frame and giving a higher weight to such high luminance areas, and the automatic exposure control can be realized excluding the influence of the areas where the main object is absent.

[AE Reference Value Parameter P5]

The AE reference value parameter indicates a luminance level taken as the reference for exposure control, and is stored by a numerical value. It is used for discriminating whether the exposure is excessive or deficient, and, in the present embodiment, set at 50 IRE. Also this parameter is fixed in each phototaking mode, regardless of the input luminance level.

[Image Quality Regulating Parameter P6]

This parameter is used for designating the image quality regulating process, for example by aforementioned aperture control. It is defined by codes, and is fixed in each phototaking mode, regardless of the input luminance level.

In the landscape mode it is defined as "NORMAL", wherein the basic image quality is taken as the reference value, and there is not employed particular image processing, such as the image quality regulation by the aforementioned aperture control.

[Image Effect Process Parameter P7]

It is used for designating an image processing, such as fading explained in relation to FIG. 16, and the content of this parameter is defined by codes. In the present case, it is defined as "NORMAL", wherein the basic image quality is set at the standard value, without any particular processing. The attribution of this parameter is fixed. The parameter is set according to the photographing mode and not changed by input luminance level.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

In the foregoing there have been explained the structure of the look-up table LUT defining the control parameters, and the function characteristics of the control parameters set by the table, taking the landscape mode as an example.

In the following there will be explained the sequence of reading the data from the LUT shown in FIG. 18 into the system control circuit, calculating the control parameters and setting the parameters as shown in FIG. 11, with reference to a flow chart shown in FIG. 20.

The sequence is basically executed within a sequence in FIG. 14, from the step S2 for confirmation of the program mode to the step S23 for releasing the control data for the iris aperture, shutter speed and gain, based on the control parameters.

Figure 20:
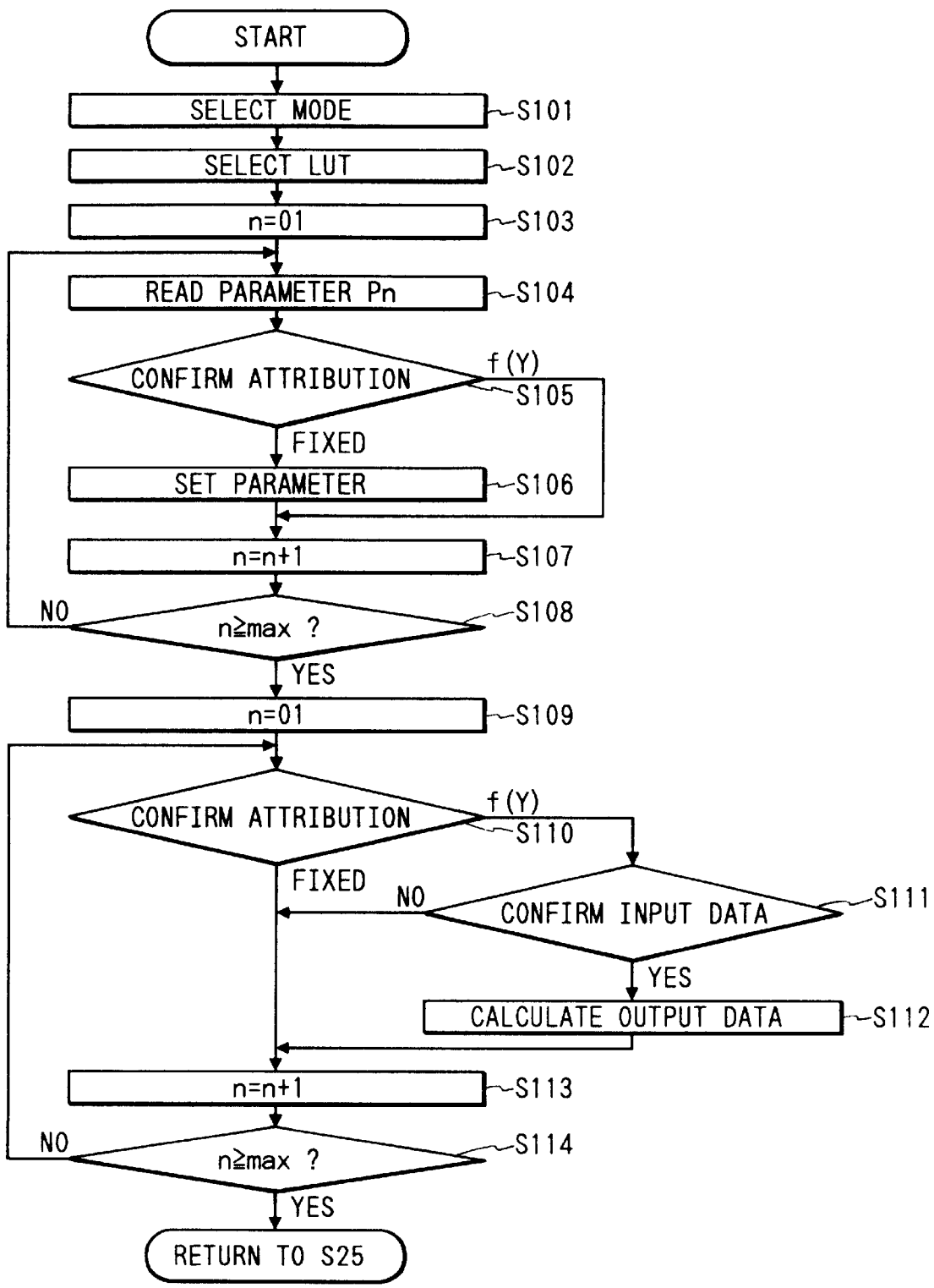
FIG. 20 is a flow chart showing the details of the flow chart shown in FIG. 14.

FIG. 20 is a flow chart showing the control routine for setting the control characteristics corresponding to the selected program mode, to be executed in parallel to the sequence of the steps S2 to S23 in FIG. 14, and, after the execution of this routine, the sequence proceeds to the step S24 in FIG. 14.

When the control sequence is started, a step S101 selects the phototaking mode according to the instruction from the operation unit 20 shown in FIG. 3, and the result of selection is fetched in the system control circuit 25. Then a step S102 selects one of the LUT's 19a–19c, according to the selected phototaking mode.

A step S103 initializes a parameter counter, for designating the parameter, to n=01, and a next step S104 reads the data of a parameter Pn designated in the step S103.

In the embodiment shown in FIG. 18, the data on iris aperture in case of n=01; data on shutter speed in case of n=02; data on gain in case of n=03; data on AE weighting in case of n=04; data on the AE reference level in case of n=05; data on image quality regulation in case of n=06; or data on special image processing in case of n=07; are fetched in the system control circuit 25.

A step S105 confirmed the property of the fetched parameter, thereby discriminating whether the parameter is variable according to the input parameter (f(Y)) or is fixed in the selected mode, regardless of the input parameter.

As shown in FIG. 18, the property or attribution indicates whether the parameter is variable by the input parameter which is the object luminance in the present embodiment, according to a function f(Y) or is fixed regardless of the change in said input parameter. If the step S105 identifies that the parameter is variable according to f(Y), depending on the input parameter, the sequence proceeds to a step S107, but, if the parameter is fixed, the sequence proceeds to a step S106 for fixing the value of said parameter.

The step S107 effects addition of "1" thereby shifting the count of the parameter counter to n+1, and a step S108 discriminates whether the count n has exceeded the maximum value in the LUT. The sequence of the steps S104 to S107 is repeated to effect the parameter reading and the discrimination of the property of such parameters in repeated manner. When the count n exceeds said maximum value, the sequence proceeds to a data output process starting from a step S109.

The process executes calculation and output of control data, based on the parameters read from the LUT in the steps S101 to S108. A step 109 resets the parameter counter to n=01.

A step S110 discriminates whether the parameter is variable depending on the input parameter (f(Y)) or fixed regardless of the input parameter, and the sequence proceeds respectively to a step S111 or a step S113.

A step S111 effects sampling of the output of the integrator 10 through the A/D converter 11 at every unit processing time (for example a field period), thus fetching the luminance signal as the input parameter into the system control circuit 25. Then the LUT is referred to, and there is discriminated whether the data calculation is required or not, according to the value of the input signal. If the calculation is required, the sequence proceeds to a step S112 for varying the parameter designated in the current situation and calculating the optimum value of said parameter for obtaining an appropriate exposure.

If the step S111 identifies that the calculation is unnecessary, the sequence proceeds to a step S113, skipping a step S112 for calculating the control output.

The step S113 adds "1" to the parameter counter n, and the sequence returns to the step S110 until a step S114 identifies that the count n of the parameter counter has exceeded the maximum parameter number of the LUT, thereby repeating the above-explained process of the steps S110 to S113 for all the parameters. When said count n has exceeded said maximum parameter number, the sequence returns from a step S115 to the step S24 in FIG. 14.

The automatic exposure control data are calculated by reading the characteristics of the parameters from the look-up table as explained in the foregoing, and the optimum phototaking operation can be achieved by the control according to the control data matching the phototaking situation, read from the LUT corresponding to the selected phototaking mode.

As explained in the foregoing, the image pickup device of the present invention, being capable of control of the phototaking operation with plural parameters, with set conditions of control data read from a data table matching the phototaking mode, provides a advantages of more delicate control than in the conventional devices and of achieving an optimum phototaking operation merely by the selection of the phototaking mode, in various phototaking conditions.

Also there is provided a photometry mode in which the image frame is plural areas, then a luminance histogram is prepared according to the luminance in each of said plural areas, and the exposure control is executed only on N areas of the highest luminance. The mode enables appropriate exposure control on a locally illuminated object in a dark background, and such object has been difficult to handle in the conventional devices. Thus the device of the present invention can achieve optimum exposure control under various phototaking situations.

Furthermore, as the photometry area is switched in linkage with the switching of the phototaking mode, the operability is improved and the eventual error in setting can be avoided.

In the following there will be given a detailed description on the setting and control of the portrait mode.

The portrait mode, selected by the operation unit 20, employs the center weighted photometry as shown in FIG. 7. FIG. 21 shows the internal structure of the data table LUT storing the definition and characteristics of the control parameters required in the control of this mode.

FIG. 17 is a program chart, showing the function of the control parameters defined and set by said LUT, as a function of the luminance level constituting the input parameter. Though the actual program chart resembles FIG. 9 or 10, but, for the purpose of simplicity, the operating ranges are shown in the order of the iris aperture, shutter speed and gain from above, as in FIG. 11.

Referring to FIG. 17, the object luminance on the abscissa is divided into three areas by two threshold values y1, y2, wherein the iris aperture I (P1) varies from a closed state to an open state as indicated at the right-hand side of the chart; the shutter speed S (P2) varies between a high speed T1 and a standard speed 1/60 sec.; and the gain controlling parameter G (P3) varies from an amplification of ±0 dB and a predetermined value G1.

In the respective variable area, each parameter varies its value by calculation according to the luminance level constituting the input parameter, as shown in the foregoing program charts in FIGS. 9 and 10.

This portrait mode estimates a person and the main object, and emphasizes to realize a small depth of focus.

In the following there will be given explanation on the control parameters contained in these charts.

[P1: Iris Aperture Controlling Parameter]

The iris aperture controlling parameter varies according to the input parameter Y or the luminance level, and is defined by a function f(Y) of the input luminance.

In case the input luminance is higher than the threshold value y1 shown in FIG. 17, a message [→CAL] indicates that a calculation is required, as indicated in FIG. 21.

In the high luminance area, in order to secure the S/N ratio, the gain of AGC is maintained at ±0 dB, and the control is so conducted as to open the iris to the fully open state, thereby avoiding the deterioration in resolving power resulting from the diffraction by a small aperture of the iris.

In case the input luminance level is lower than y1, a control for setting the iris at the fully open state is indicated by [→OPEN].

Such control provides the smallest depth of focus, thus making the photographed person conspicuous from the background. This is the basic state of control characteristics in the portrait mode.

Thus the control for the iris aperture is defined by dividing the entire luminance range into two areas by a threshold value y1.

[P2: Shutter Speed Controlling Parameter]

The shutter speed controlling parameter is defined by a function f(Y) of the luminance, in relation to threshold values y1 and y2.

In case the input luminance level is higher than y1, the shutter speed is fixed at a high speed T1, as indicated by [→T1], and the calculation is not required in this case.

The high shutter speed T1 is selected at a relatively high value, in order to reduce the depth of focus, as well as to avoid the small iris aperture. In practice said shutter speed is selected within a range of 1/250–1/4000 sec.

Also in this stage, in order to maintain the S/N ratio, the gain of AGC is not elevated as far as possible, even when the luminance becomes low.

At an input luminance level between y1 and y2, the control is executed by calculating the optimum shutter speed according to the input luminance level, as indicated by [→CAL].

The variable control range in this area is between the aforementioned T1 and the field frequency (standard value) of the television standard.

In case the input luminance level is lower than y2, the shutter speed is set at the standard value of the television signal, as indicated by [→STANDARD].

The above-mentioned standard value of the television signal is 1/60 sec. in the NTSC standard, or 1/50 sec. in the PAL standard.

In this state, the gain of AGC alone remains as the controllable parameter. Thus the exposure control is executed by elevating the gain within the permissible range of the S/N ratio.

[P3: Gain of AGC]

The gain of AGC is defined by a function f(Y) of the input luminance, depending on plural threshold values, and, if the input luminance is higher than y2, it is defined by [→±0 dB] at ±0 dB, whereby the AGC circuit does not have the amplification effect. Thus, while the exposure control is possible by the iris aperture and the shutter speed, the gain of AGC is fixed in order to prevent deterioration in the S/N ratio. The calculation is unnecessary in this case.

Since such area is designed to cover most of the object luminance, the phototaking operation with satisfactory S/n ratio can be achieved in the entire range.

In case the input luminance is lower than y2, the optimum gain is calculated as indicated by [→CAL].

In this state, the remaining controllable parameter is only the gain of AGC, since other parameters are already set for responding to the low luminance state. Thus, the exposure control is executed by an increase of the gain in the permissible range, in consideration of the deterioration of the S/N ratio.

The three control parameters are correlated with three areas divided by the threshold values y1, y2, as shown in FIG. 17. Also in this case, calculation in each area is required for only one parameter and can therefore be simplified. The parameters are respectively the iris aperture, the shutter speed and the gain of AGC, in the order from the high luminance side.

[P4: AE Weighting Parameter (Weighting of Light Metering Area)]

This is a parameter defining the distribution and weighting of the photometry area in the image frame, as shown in FIGS. 7 and 8. It is a fixed parameter, stored in a map format as shown in FIG. 21. It has different set values for the different LUT's corresponding to the phototaking modes, but is fixed within each mode, regardless of the luminance signal level.

In the present embodiment, this parameter is directly assigned, in the format of a map, to the 24 areas. In the portrait mode, a coefficient 1.0 is assigned to the central 8 areas, while a smaller coefficient 0.5 is assigned to the peripheral 16 areas in the form of center weighted photometry shown in FIG. 7.

[P5: AE Reference Value Parameter]

The AE reference value parameter indicates a luminance level taken as the reference for exposure control, and is stored by a numerical value. It is used for discriminating whether the exposure is excessive or deficient, and, in the present embodiment, set at 50 IRE. Also this parameter is fixed in each phototaking mode, regardless of the input luminance level.

[P6: Image Quality Regulating Parameter]

This parameter is used for designating the image quality regulating process, for example by aforementioned aperture control. It is defined by codes, and is fixed in each phototaking mode, regardless of the input luminance level.

In the "NORMAL" state the basic image quality is taken as the reference value, and a particular image processing is not executed. In the "SOFT" state the frequency characteristics are varied from the standard value.

In the portrait mode there is employed the "SOFT" setting, which provides an image of soft feeling by adopting frequency characteristics with reduced response in the frequencies relating to the sharpness in human vision, or the frequencies of 2–3 MHz in the television signal.

[P7: Image Effect Process Parameter]

It is used for designating an image processing, such as fading explained in relation to FIG. 16, and the content of this parameter is defined by codes.

In the "NORMAL" state, the basic image quality is set at the standard value, without any particular processing.

The portrait mode employs the "WHITE-FADE" setting, in which a white fading circuit, normally employed for scene switching, is activated to gradually change the entire image frame to white. More specifically, in the circuit shown in FIG. 16, the system control circuit 25 instructs (X1) the color signal generator 30 to generate white color, then the switch is shifted to the side of said generator 30 (X2), and the multiplication coefficient is set about 0.1 to 0.5 so as to obtain a mixing ratio of white color of about 30%.

This parameter also is fixed in each phototaking mode, regardless of the input luminance level.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

As explained above, the portrait mode employs the center weighted photometry, but it is extremely effective to apply the above-mentioned image quality regulation or image processing in combination, as the phototaking operation is principally executed on a person as the object.

In the foregoing there have been explained the structure of the data table LUT defining the control parameters and the function characteristics of the control parameters defined by said table, taking the portrait mode as an example.

The process of calculating the control parameters by reading the data from the LUT shown in FIG. 21 to the system control circuit and setting the control parameters as shown in FIG. 17 is same as that shown in FIG. 20, and will not, therefore, be explained further.

As explained in the foregoing, the image pickup device of the present invention, being capable of control of the phototaking operation with plural parameters, with set conditions of control data read from a data table matching the phototaking mode, provides the advantages of more delicate control than in the conventional devices, such as, in the portrait phototaking, maintaining a small depth of focus thereby emphasizing the main object even under a change in the phototaking situation. Thus there is achieved an optimum phototaking operation merely by the selection of the phototaking mode, in various phototaking conditions.

In the following there will be explained the structure of the data table and the control of the "sports" mode shown in FIG. 10, with reference to FIGS. 22 and 23.

The sport mode, selected by the operation unit 20, employs the center weighted photometry as shown in FIG. 7. FIG. 22 shows the internal structure of the data table LUT storing the definition and characteristics of the control parameters required in the control of this mode.

In the following description, in order to clarify the correlation with the data table LUT, there is employed a parameter transition chart, shown in FIG. 23, indicating the function ranges of the control parameters as a function of the luminance level constituting the input parameter.

Figure 23:
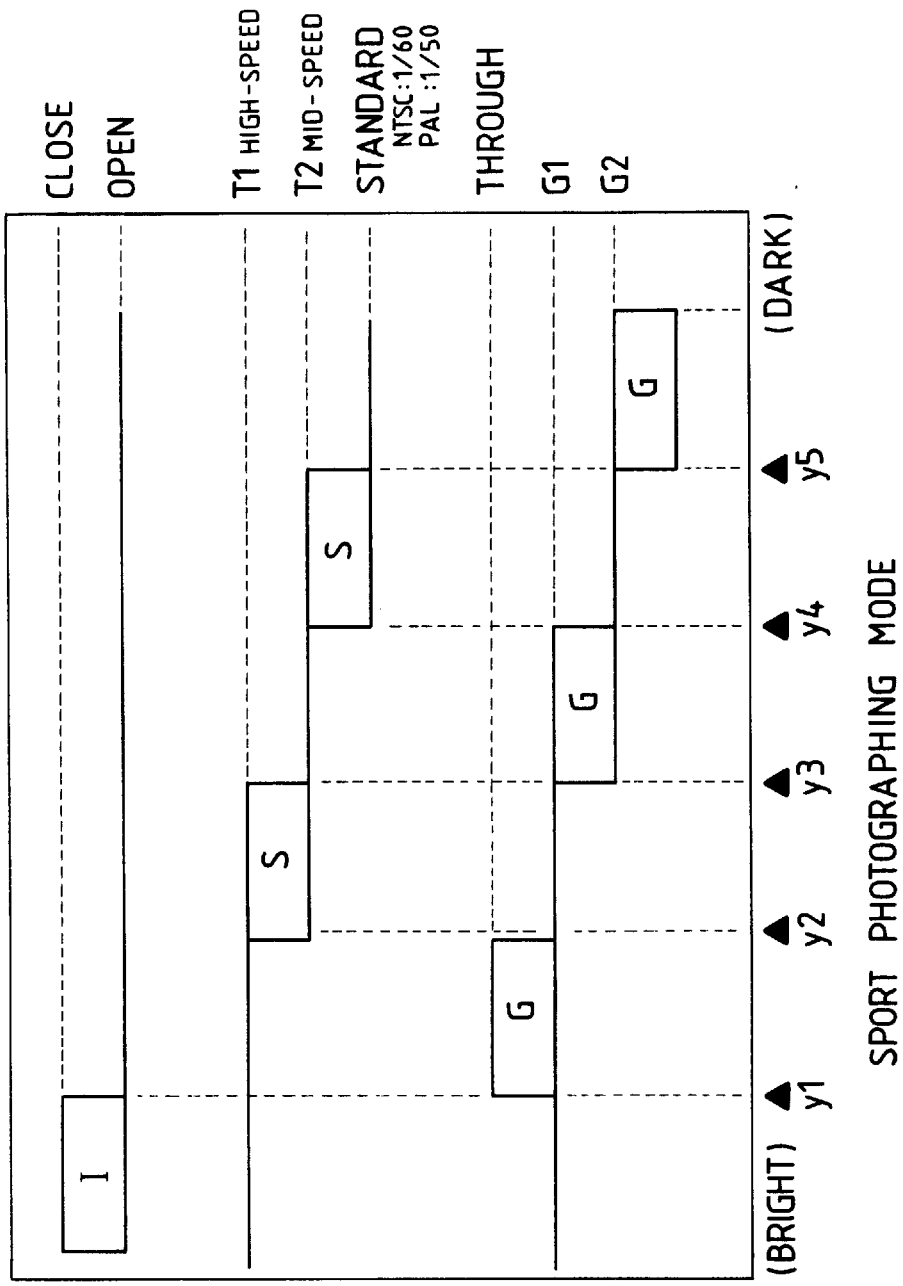
FIG. 23 is a program chart showing the parameter processing corresponding to the "sports mode"

Referring to FIG. 23, the object luminance on the abscissa is divided into six areas by five threshold values y1–y5. In each area, the iris aperture controlling parameter I (P1), the shutter speed controlling parameter S (S2) and the gain controlling parameter G (P3). As indicated at the right-hand side of the chart, the iris aperture is varied between the closed state and the open state; the shutter speed is varied among a high speed T2, an intermediate speed T2 and a standard speed of $1/60$ sec (NTSC); and the gain is varied among a "through" state of $±0$ dB, a predetermined value G1 and a larger predetermined value G2. In FIG. 23, I, S and G respectively indicate the variable areas of said parameters.

In the following there will be explained the control parameters contained in the data tables for the sports mode.

[P1: Iris Aperture Controlling Parameter]

The iris aperture controlling parameter varies according to the input parameter Y or the luminance level, and is defined by a function f(Y) of the input luminance.

In case the input luminance is higher than the threshold value y1 shown in FIG. 23, the calculation is required, as indicated by a message [→CAL] in FIG. 22.

In the high luminance area, in order to secure the S/N ratio, the gain of AGC is maintained at $±0$ dB, and the control is so conducted as to open the iris to the fully open state, in order to avoid the deterioration in resolving power resulting from the diffraction by a small aperture of the iris.

In case the input luminance level is lower than y1, a control for setting the iris at the fully open state is indicated by [→OPEN].

In this state since the amount of light becomes deficient with respect to the currently selected shutter speed, the control is executed by slightly elevating the gain by an amount not causing a noticeable deterioration of the S/N ratio and maintaining the shutter speed as fast as possible, thereby enabling to respond to a fast-moving object.

Thus the control for the iris aperture is defined by dividing the entire luminance range into two areas by a threshold value y1.

[P2: Shutter Speed Controlling Parameter]

The shutter speed controlling parameter is defined by plural threshold values.

In case the input luminance is higher than y2, the shutter speed is fixed at a high shutter speed T1 by an instruction [→T1]. In this area, therefore, there is not required the calculation of the shutter speed as a function of the input luminance.

The shutter speed T1 is selected at a relatively fast speed for avoiding the small aperture of the iris as explained above, but is in practice selected within a range of $1/250$ to $1/1000$ sec.

In this state the shutter speed is fixed at T1 and the decrease in the luminance is compensated by opening the iris to the fully open state, but, since the iris reaches the fully open state at the threshold value y1, the amount of light becomes deficient in the area between y1 and y2. In this area, therefore, the gain of AGC is elevated within the permissible range of the S/N ratio, in order to maintain the shutter speed as fast as possible.

In case the input luminance is betwen y2 and y3, an instruction [→CAL] indicates that the control parameter has to be set by calculating the optimum shutter speed. The variable control range in this area is between T1 and T2.

The shutter speed T2 is selected so as to reasonably sharply record a moving object.

In an area between y3 and y4, an instruction is given to fix the shutter speed at T2, so that the shutter speed need not be calculated. The gain of AGC in this area is controlled in the same manner as in the above-mentioned area between y1 and y2.

In case the input luminance is between y4 and y5, an instruction [→CAL] indicates a control to calculate the optimum shutter speed according to the input luminance and to set the control parameter at T2 or slower.

In this area, it is not desirable to further elevate the gain of AGC in consideration of the S/N ratio of the image since the luminance is already considerably lowered, so that the shutter speed has to be made slower sacrificing the resolving power for the moving object.

However, since the shutter speed can be varied in small steps in this area, consecutive changes in the shutter speed do not generate unnatural impression in the image.

In case the input luminance is lower than y5, an instruction [→STANDARD VALUE] indicates that the shutter speed is to be fixed at the standard value of the television signal.

The above-mentioned standard value of the television signal is 1/60 sec. in case of NTSC standard, or 1/50 sec. in case of PAL standard.

In this state, since the gain of AGC alone remains as the controllable parameter, the exposure control is executed by elevating the gain within the permissible range of the S/N ratio.

[P3: Gain of AGC]

The gain of AGC is defined by a function f(Y) of the input luminance, and, if the input luminance is higher than y1, an instruction [→±0 dB] is given to fix the gain at ±0 dB, whereby the AGC circuit does not have the amplification effect. Thus, while the exposure control is possible by the iris aperture and the shutter speed, the gain of AGC is fixed in order to prevent deterioration in the S/N ratio. The calculation is unnecessary in this case.

In case the input luminance is between y1 and y2, an instruction [→CAL] is given to set the gain controlling parameter by calculating the optimum gain in response to the input luminance.

In case the input luminance is between y2 and y3, the gain of AGC is fixed at a predetermined value G1, and the calculation is unnecessary.

In case the input luminance is between y3 and y4, an instruction [→CAL] is given to set the gain controlling parameter by calculating the optimum gain in response to the input luminance.

In case the input luminance is between y4 and y5, the gain of AGC is fixed at a predetermined value G2 higher than G1, and the calculation is unnecessary.

In case the input luminance is lower than y5, an instruction [→CAL] is given to set the gain controlling parameter by calculating the optimum gain in response to the input luminance.

FIG. 23 shows the relationship of three parameters as a function of the luminance in the abscissa, which is divided into six areas by five threshold values, and in each of said areas, calculation is required for only one control parameter and can therefore be simplified. It is therefore possible to suppress the magnitude of calculation and to increase the calculating speed even when the number of parameters is increased. The calculated parameters are I, G, S, G and S in the order from the high luminance side, and the portion [G, S] may be repeated in a larger number of times to attain more precise control.

As explained above, the entire control operation consists of the iris aperture control at the high luminance side, and then alternate controls of the gain and the shutter speed in areas of a suitable width.

In the following there is given a specific example of parameters in case the entire range is divided more finely into 10 areas:

| Area | Iris | Shutter speed | Gain |
|---|---|---|---|
| (max. luminance | closed | 1/1000 | ±0 dB) |
| No. 1 | closed - open | 1/1000 | ±0 dB |
| No. 2 | open | 1/1000 | ~ |
| No. 3 | open | ~ | +3 dB |
| No. 4 | open | 1/500 | ~ |
| No. 5 | open | ~ | +6 dB |
| No. 6 | open | 1/250 | ~ |
| No. 7 | open | ~ | +9 dB |
| No. 8 | open | 1/125 | ~ |
| No. 9 | open | ~ | +12 dB |
| No. 10 | open | 1/60 | ~ |
| (min. luminance | open | 1/60 | +15 dB) |

[P4: AE Weighting Parameter=Weighting of Photometry area]

This is a parameter defining the distribution and weighting of the light metering area in the image frame, as shown in FIG. 8. It is a fixed parameter, stored in a map format as shown in FIG. 22. It has different set values for the different LUT's correspondding to the phototaking modes, but is fixed within each mode, regardless of the luminance signal level.

In the present embodiment, this parameter is directly assigned, in the format of a map, to the 24 areas.

In this sports mode, a coefficient 1.0 is assigned to the central 8 areas, while a smaller coefficient 0.5 is assigned to the peripheral 16 areas in the form of center weighted photometry shown in FIG. 8.

[P5: AE Reference Value Parameter]

The AE reference value parameter indicates a luminance level taken as the reference for exposure control, and is stored by a numerical value. It is used for discriminating whether the exposure is excessive or deficient, and, in the present embodiment, set at 50 IRE. Also the parameter is fixed in each phototaking mode, regardless of the input luminance value.

[P6: Image Quality Regulating Parameter]

This parameter is used for designating the image quality regulating process, for example by afore-mentioned aperture control. It is defined by codes, and is fixed in each phototaking mode, regardless of the input luminance level.

The sports mode employs the "NORMAL" state, in which the basic image quality is taken as the reference value, and a particularly image processing, such as the image quality control by the aperture control, is not executed.

[P7: Image Effect Process Parameter]

It is used for designating an image processing, such as fading explained in relation to FIG. 16, and the content of this parameter is defined by codes.

There is employed the "NORMAL" state, in which the basic image quality is set at the standard value, without any particular processing.

This parameter also is fixed in each phototaking mode, regardless of the input luminance level.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

As explained in the foregoing, the image pickup device of the present invention, being capable of control of the phototaking operation with plural parameters, with set conditions of control data read from a data table matching the phototaking mode, provides the advantages of more delicate control than in the conventional devices, such as, in case of taking a fast-moving object, giving priority to the fast shutter speed thereby constantly obtaining a sharp image in the sports phototaking. Thus there is achieved an optimum phototaking operation merely by the selection of the phototaking mode, in various phototaking conditions.

In the following there will be explained the structure of the data table and the control of the "landscape" mode.

The landscape mode, selected by the operation unit 20, employs the center weighted light metering as shown in FIG. 7. FIG. 24 shows the internal structure of the data table LUT storing the definition and characteristics of the control parameters required in the control of this mode.

The program chart, showing the transition of the control parameters, defined and set by said LUT as a function of the luminance level constituting the input parameter, is same as shown in FIG. 11.

Referring to FIG. 11, the object luminance on the abscissa is divided into two areas by a threshold value y.

This landscape mode anticipates a landscape as the object. Consequently the possibility of presence of flicker or a flast-moving object is low, but it is necessary to render the light metering area variable and to set the control parameters matching the object because, as already explained in relation to FIG. 8, a high luminance portion such as sky is often present in the image frame.

In the following there will be given explanation on the internal structure of the data table LUT and the control of the parameters set by said LUT.

[P1: Iris Aperture Controlling Parameter]

The iris aperture controlling parameter varies according to the input parameter Y or the luminance level, and is defined by a function f(Y) of the input luminance.

In case the input luminance is higher than the threshold value y shown in FIG. 11, an instruction [→CAL] indicates that a calculation is required, as shown in FIG. 24.

In the high luminance area, in order to secure the S/N ratio, the gain of AGC is maintained at ±0 dB (through), and the control is conducted by varying the iris from the smallest aperture to the fully open state.

In case the input luminance level is lower than y, a control for setting the iris at the fully open state is indicated by [→OPEN].

In this area the luminance can be considerably low, and the gain of AGC is elevated at the sacrifice of the S/N ratio if the phototaking operation is still desired.

Thus the control for the iris aperture is defined by dividing the entire luminance range into two areas by a threshold value y.

[P2: Shutter Speed Controlling Parameter]

As the possibility of presence of flicker or a fast-moving object is low, and also as it is not required to reduce the depth of focus, the shutter speed controlling parameter is constantly fixed, regardless of the input luminance level. An instruction [→STANDARD VALUE] is given to fix the shutter speed at the standard value of the television signal, and the calculation is unnecessary.

The standard value of the television signal is ⅟60 sec. for NTSC standard, or ⅟50 sec. for PAL standard.

[P3: Gain of AGC]

The gain is defined by a function f(Y) of the input luminance, according to the threshold value y, and, if the input luminance is higher than y1, it is defined, by an instruction [→±0 dB], at ±0 dB, whereby the AGC circuit does not have the amplification effect. Thus, while the exposure control is possible by the iris aperture and the shutter speed, the gain of AGC is fixed in order to prevent deterioration in the S/N ratio. The calculation is unnecessary in this case.

Since such area is designed to cover most of the object luminance, the phototaking operation with satisfactory S/n ratio can be achieved in the entire range.

In case the input luminance is lower than y1, an instruction [→CAL] is given to set the gain controlling parameter by calculating the optimum gain.

In this area, the luminance is considerably low, so that the gain is elevated if the phototaking operation is to be conducted at the sacrifice of the S/N ratio.

In this state, the remaining controllable parameter is the gain of AGC alone, since other parameters are already set for responding to the low luminance state. Thus, the exposure control is executed by an increase of the gain in the permissible range, in consideration of the deterioration of the S/N ratio.

The three control parameters are correlated with two areas divided by the threshold value y1, as shown in FIG. 11. Also in this case, calculation in each area is required for only one parameter and can therefore be simplified. Said parameters are respectively the iris aperture and the gain, in order from the high luminance side.

[P4: AE Weighting Parameter=Weighting of Photometry Area]

This is a parameter defining the distribution and weighting of the light metering area in the image frame, as shown in FIGS. 7 and 8. This parameter is fixed, and stored in the format of a map, as shown in FIG. 24.

It varies according to the LUT corresponding to each phototaking mode, but is fixed in each phototaking mode, regardless of the luminance signal level.

In the present embodiment, 24 calculation coefficients are directly assigned, in the format of map, to 24 areas. In this "landscape" mode, a coefficient 0.0 is assigned to 6 areas in the uppermost row, then a coefficient 0.5 is assigned to 6 areas in the next row, and a coefficient 1.0 is assigned to 2×6 areas in the lower half, whereby a "lower part weighted light metering" shown in FIG. 8 is realized.

Such configuration allows to prevent an underexposure of the object, resulting from the influence of the high luminance portion such as sky.

The distribution of the photometry areas is not limited to that shown in FIG. 8. For example there may be employed a distribution in which a weighting coefficient 0.0 is assigned to the areas Nos. 1 to 12 in the upper two rows as shown in FIG. 6 and a coefficient of 1.0 is assigned to the areas Nos. 13 to 24 in the lower two rows; another distribution in which a coefficient 0.0 is assigned to the areas Nos. 1 to 6 in the uppermost row, a coefficient 0.5 is assigned to the area Nos. 7–18 in the middle two rows, and a coefficient 1.0 is assigned to the areas Nos. 19 to 24 in the lowermost row; or still another distribution in which a coefficient 0.0 is assigned to the areas Nos. 1 to 12 in the upper two rows, a coefficient 1.0 is assigned to the areas Nos. 14 to 17 in the lower central area, and a coefficient 0.5 is assigned to the areas Nos. 13, 18, 19 to 24. In particular, the last mentioned distribution is effective in case an object of high luminance is present also in the front side of the image frame. The range of the phototaking operations can be widened by storing these distributions in data tables and suitably selecting one of such distributions.

[P5: AE Reference Value Parameter]

The AE reference value parameter indicates a luminance level taken as the reference for exposure control, and is stored by a numerical value. It is used for discriminating whether the exposure is excessive or deficient, and, in the present embodiment, set as 50 IRE. Also this parameter is fixed in each phototaking mode, regardless of the input luminance level.

[P6: Image Quality Regulating Parameter]

This parameter is used for designating the image quality regulating process, for example by aforementioned aperture control. It is defined by codes, and is fixed in each phototaking mode, regardless of the input luminance level.

In the landscape mode it is defined as "NORMAL", wherein the basic image quality is taken as the reference value, and there is not employed particular image processing, such as the image quality regulation by the aforementioned aperture control.

[P7: Image Effect Process Parameter]

It is used for designating an image processing, such as fading explained in relation to FIG. 16, and the content of this parameter is defined by codes. In the present case, it is defined as "NORMAL", wherein the basic image quality is set at the standard value, without any particular processing.

Also this parameter is fixed in each phototaking mode, regardless of the input luminance level.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

In the foregoing there have been explained the structure of the data table LUT defining said control parameters, and the function characteristics of the control parameters set by said table, taking the landscape mode as an example.

The process of calculating the control parameters by reading data from the LUT shown in FIG. 24 to the system control circuit and setting the control parameters as shown in FIG. 11 is same as that shown in the flow chart in FIG. 20.

As explained in the foregoing, the image pickup device of the present invention, being capable of control of the phototaking operation with plural parameters, and with set conditions of control data read from a data table matching the phototaking mode, provides the advantages of more delicate control than in the conventional devices, such as, in case of taking a landscape frequently containing a high luminance portion in the upper part of the image frame, setting a photometry distribution with priority in the lower part simultaneously with the selection of the phototaking mode, thereby avoiding underexposure of the object resulting from the influence of said high luminance portion. Thus there is achieved an optimum phototaking operation merely by the selection of the phototaking mode, in various phototaking conditions.

In the following there will be explained the structure of the data table and the control of the "snow and surf" mode.

The "snow and surf" mode is a program mode for a situation in which a large area of the image frame is constituted by a high luminance portion such as snow or sand beach.

Phototaking of a main object present in such background generally results in underexposure, because of the influence of the highly luminant background.

It is conceivable to correct the exposure for preventing such underexposure of the main object, but such simple method is difficult to provide appropriate exposure control on the main object and the background if a highly bright background such as snowed landscape or beach occupies a major part of the image frame, and there will result a drawback that the background appears in unnatural manner, such as white color appearing gray.

The "snow and surf" mode of the present invention, to be selected by the operation unit 20, is to enable satisfactory exposure control and to provide an image without unnatural impression, even under such phototaking situation.

FIG. 25 shows the internal structure of the data table LUT, which is referred to when this mode is selected, and which stores the definition and characteristics of the control parameters required for the control of the mode.

The program chart, showing the transition of the control parameters as a function of the input luminance level is similar to that for the portrait mode, shown in FIG. 17.

However, though the design of said program chart is similar, the two threshold values and the values of the shutter speed and the gain are different in these modes. Thus, for the purpose of distinction, the threshold values in this mode are represented by y1', y2', the high shutter speed by T1', and the gain by G1'.

In the following there will be given an explanation on the parameters appearing in these 5 drawings.

[P1: Iris Aperture Controlling Parameter]

The iris aperture controlling parameter varies according to the input parameter Y or the luminance level, and is defined by a function f(Y) of the input luminance.

In case the input luminance is higher than the threshold value y1' shown in FIG. 17, an instruction [→CAL] indicates that a calculation is required, as shown in FIG. 25.

In the high luminance area, in order to secure the S/N ratio, the gain of AGC is maintained at ±0 dB (through), and the control is so conducted as to open the iris to the fully open state at first, thereby avoiding the deterioration in resolving power resulting from the diffraction by a small aperture of the iris.

In case the input luminance level is lower than y1', a control for setting the iris at the fully open state is indicated by [→OPEN].

Thus the control for the iris aperture is defined by dividing the entire luminance range into two areas by a threshold value y1'.

[P2: Shutter Speed Controlling Parameter]

The shutter speed controlling parameter is defined by a function f(Y) of the luminance, in relation to threshold values y1' and y2'.

In case the input luminance level is higher than y1', the shutter speed is fixed at a high speed T1', as indicated by [→T1], and the calculation is not required in this case.

The high shutter speed T1' is selected at a relatively high value, in order to avoid the small aperture. In practice said shutter speed is selected within a range of $\frac{1}{125}$ to $\frac{1}{500}$ sec.

Also in this stage, in order to maintain the S/N ratio, the gain of AGC is not elevated as far as possible, even when the luminance becomes low.

At an input luminance level between y1'and y2', the control is executed by calculating the optimum shutter speed according to the input luminance level, as indicated by [→CAL].

The variable control range in this area is between the aforementioned T1' and the field frequency (standard value) of the television signal.

In case the input luminance level is lower than y2', the shutter speed is set at the standard value of the television signal, as indicated by

[→STANDARD VALUE].

The above-mentioned standard value of the television signal is 1/60 sec. in the NTSC standard, or 1/50 sec. in the PAL standard.

In this state, the gain of AGC alone remains as the controllable parameter. Thus the exposure control is executed by elevating the gain within the permissible range of the S/N ratio.

[P3: Gain of AGC]

The gain of AGC is defined by a funtion f(Y) of the input luminance, depending on plural threshold values, and, if the input luminance is higher than y2', it is defined, by [→±0 dB], at ±0 dB, whereby the AGC circuit does not have the amplification effect.

Thus, while the exposure control is possible by the iris aperture and the shutter speed, the gain of AGC is fixed in order to prevent deterioration in the S/N ratio. The calculation is unnecessary in this case.

Since such area is designed to cover most of the object luminance, the phototaking operation with satisfactory S/n ratio can be achieved in the entire range.

In case the input luminance is lower than y2', the optimum gain is calculated as indicated by [→CAL].

In this state, the gain of AGC alone remains as the controllable parameter, since other parameters are already set for responding to the low luminance state. Thus the exposure control is executed by an increase of the gain in the permissible range, in consideration of the deterioration of the S/N ratio.

The three control parameters are correlated with three areas divided by the threshold values y1', y2', as shown in FIG. 17. Also in this case, calculation in each area is required for only one parameter and can therefore be simplified. Said parameters are respectively the iris aperture, the shutter speed and the gain of AGC, in the order from the high luminance side.

[P4: AE Weighting Parameter (Weighting of Light Metering Area)]

This is a parameter defining the distribution and weighting of the photometry area in the image frame, and is defined by a function f(Y) of the input luminance, as shown in FIG. 25.

More specifically it is defined by a histogram prepared according to the input luminance signals. A histogram of luminance level is prepared by detecting the input luminance level in each of 24 areas in the image frame, and the priority areas in the photometry are determined by exactly detecting the distribution of high and low luminance portions in said histogram.

In the present embodiment, from the luminance histogram prepared by detecting the luminance level in each of 24 areas, there are extracted areas of upper N % (in the present embodiment, N=50%, or 24×0.5=12 areas; this value may be provided in plural numbers), and the exposure control is executed on the luminance information of said 12 areas only.

Thus the AE control is executed by assigning a coefficient 1.0 to each of the extracted areas and a coefficient 0.0 to each of the non-extracted areas.

Figure 26:
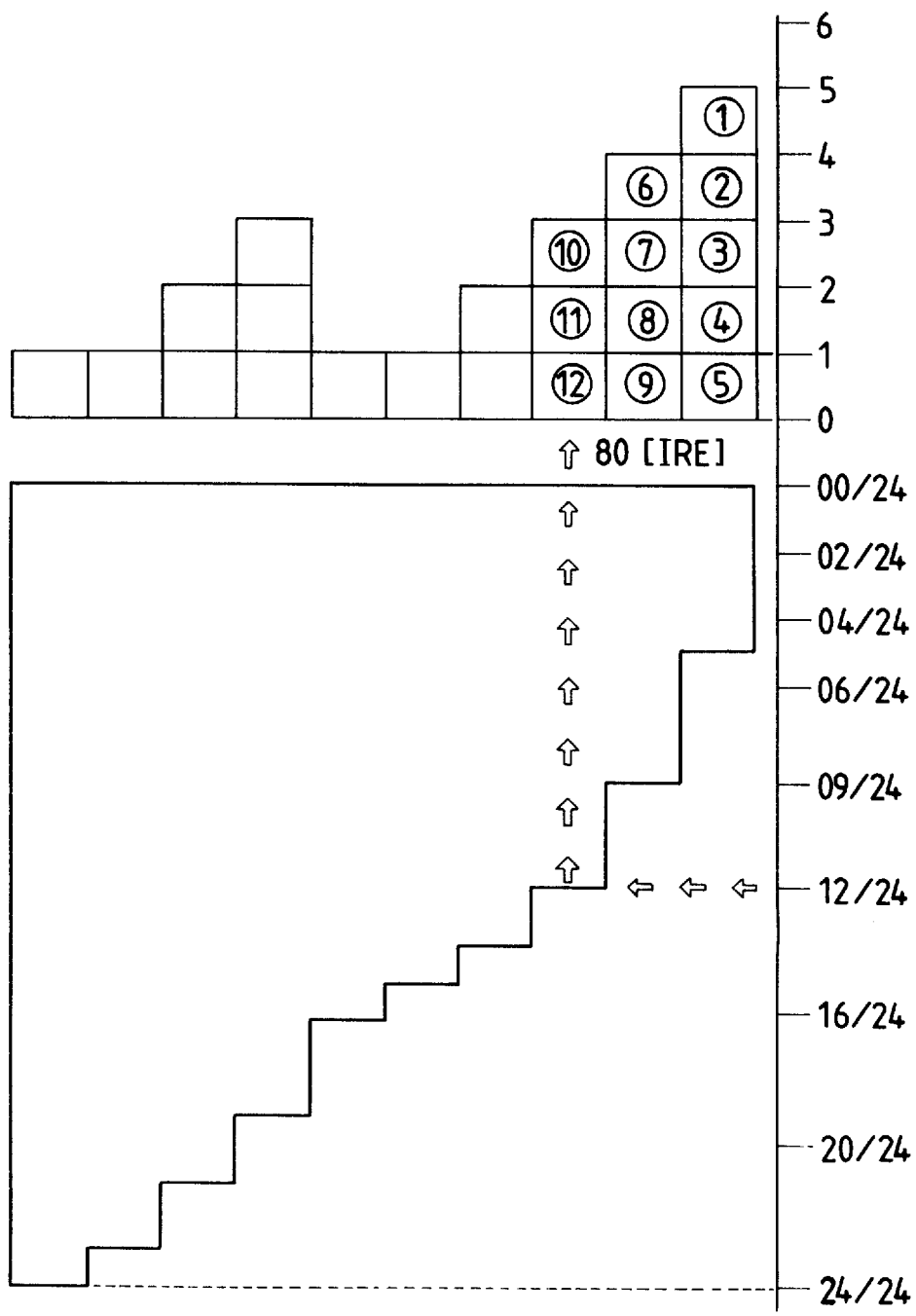
FIG. 26 is a luminance histogram for determining the light metering area corresponding to the "surf and snow mode"

FIG. 26 shows such histogram. The upper half shows a luminance histogram, in which the abscissa indicates the IRE level becoming higher from left to right, and the ordinate indicates the number of areas corresponding to each IRE level.

The lower half shows a cumulative histogram, in which the ordinate indicates the number of areas.

FIG. 26 also shows the extraction, from the 24 areas in the cumulative histogram, of upper 12 areas (1–12) corresponding to 50%, and FIG. 27 shows the weighted distribution of the light metering area based on said histogram. A weighting coefficient 1.0 is assigned to each of thus extracted areas.

Since the photometry can be conducted on the 12 areas of higher luminance, extracted from the image frame, it is rendered possible, even in a phototaking situation containing a large proportion of high luminance areas such as a snowed landscape or a sand beach, to avoid the underexposure of the main object or an unnatural image quality deterioration involving the overexposure in the high luminance area, resulting from the exposure correction for avoiding the overexposure of the main object, thereby obtaining a natural image over the entire image frame.

[P5: AE Reference Value Parameter]

The AE reference value parameter indicates a luminance level taken as the reference for exposure control, and is stored by a numerical value. It is used for discriminating whether the exposure is excessive or deficient, and, in this embodiment, set at 80 IRE which is higher than 50 IRE in the ordinary case in order to obtain an appropriate exposure for the high luminance areas, since the present embodiment anticipates a phototaking situation containing a large proportion of high luminance areas, such as a snowed landscape or a sand beach. This parameter is fixed in this phototaking mode, regardless of the input luminance level.

[P6: Image Quality Regulating Parameter]

This parameter is used for designating the image quality regulating process, for example by aforementioned aperture control. It is defined by codes, and is fixed in each phototaking mode, regardless of the input luminance level.

This phototaking mode employs the "NORMAL" setting, in which the basic image quality is set as the standard value.

[P7: Image Effect Process Parameter]

It is used for designating an image processing, such as fading explained in relation to FIG. 16, and the content of this parameter is defined by codes.

There is employed the "NORMAL" setting, without any particular image processing.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

As explained in the foregoing, the data table LUT of the present invention stores the definition and characteristics of the parameters required for the control, and plural LUT's are provided corresponding to the number of phototaking modes, and are rendered selectable according to the selected phototaking mode, so that the optimum control can always be attained under any phototaking situation.

As explained in the foregoing, the image pickup device of the present invention, being capable of control of the phototaking operation with plural parameters, with set conditions of control data read from a data table matching the phototaking mode, provides the advantages of achieving more delicate control than in the conventional devices, and attaining an optimum phototaking operation merely by the selection of the phototaking mode, in various phototaking conditions.

In practice, there is provided a photometry mode of dividing the image frame into plural areas, preparing a luminance histogram by detecting the luminance in each of said divided areas, effecting the photometry only in the areas corresponding to the upper N % in the luminance, and suitably varying the reference value for the automatic exposure control. Therefore, even in a phototaking situation that contains a large proportion of high luminance areas such as a snowed landscape or a sand beach and that has not properly been handled in the conventional exposure control, it is rendered possible to provide appropriate exposure to the main object and the background, without overexposure or underexposure.

Also since the photometry distribution is switched in linkage with the switching of the phototaking mode, the operability is improved and the errors in setting can be prevented.

In the following there will be explained a full auto mode which can cover most of the ordinary phototaking conditions.

Figure 29:
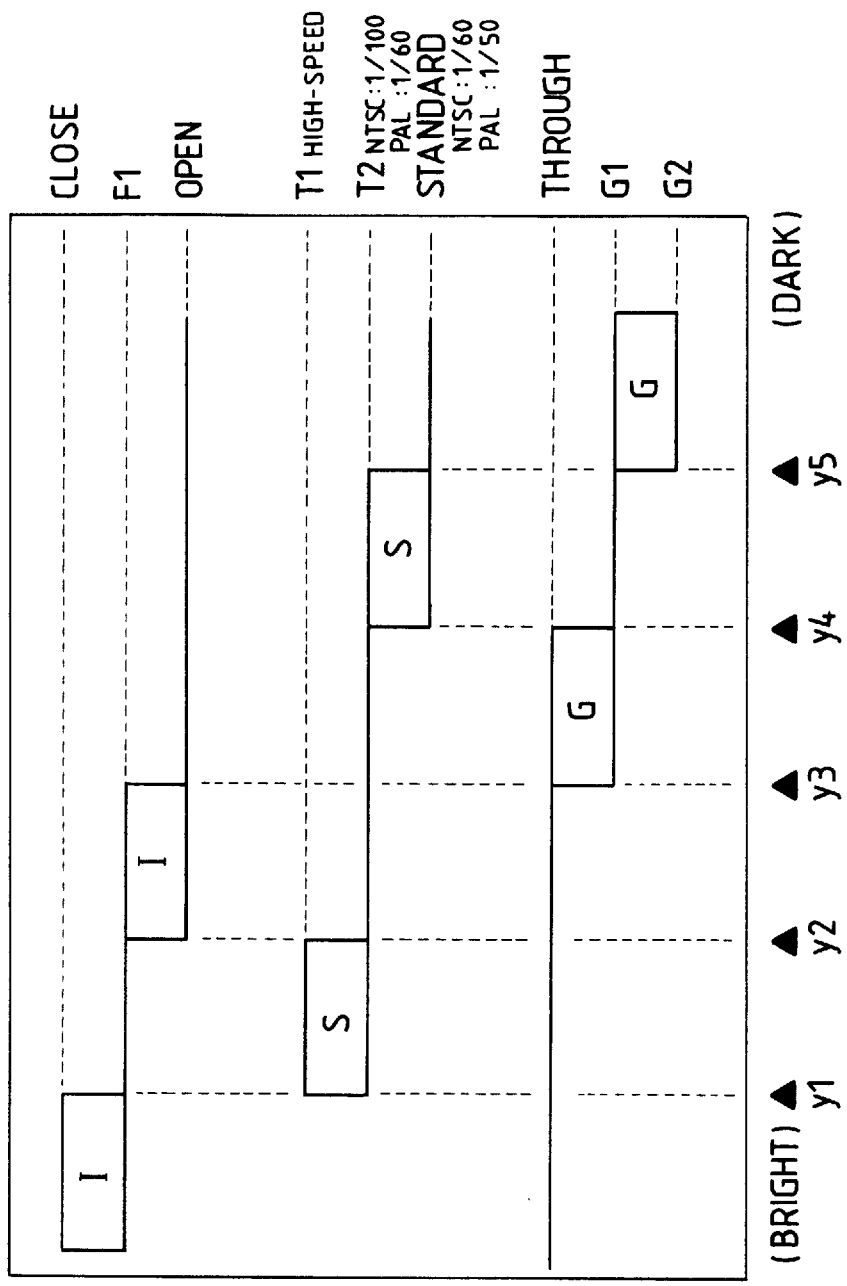
FIG. 29 is a program chart corresponding to the full auto mode shown in FIG. 28.

FIG. 28 shows the internal structure of a look-up table LUT storing the data governing the control characteristics of said full auto mode, and FIG. 29 is a chart showing the transition of the control parameters as a function of the object luminance, based on the data contained in the LUT shown in FIG. 28, and said chart corresponds to the program charts shown in FIGS. 9 and 10.

Figure 31:
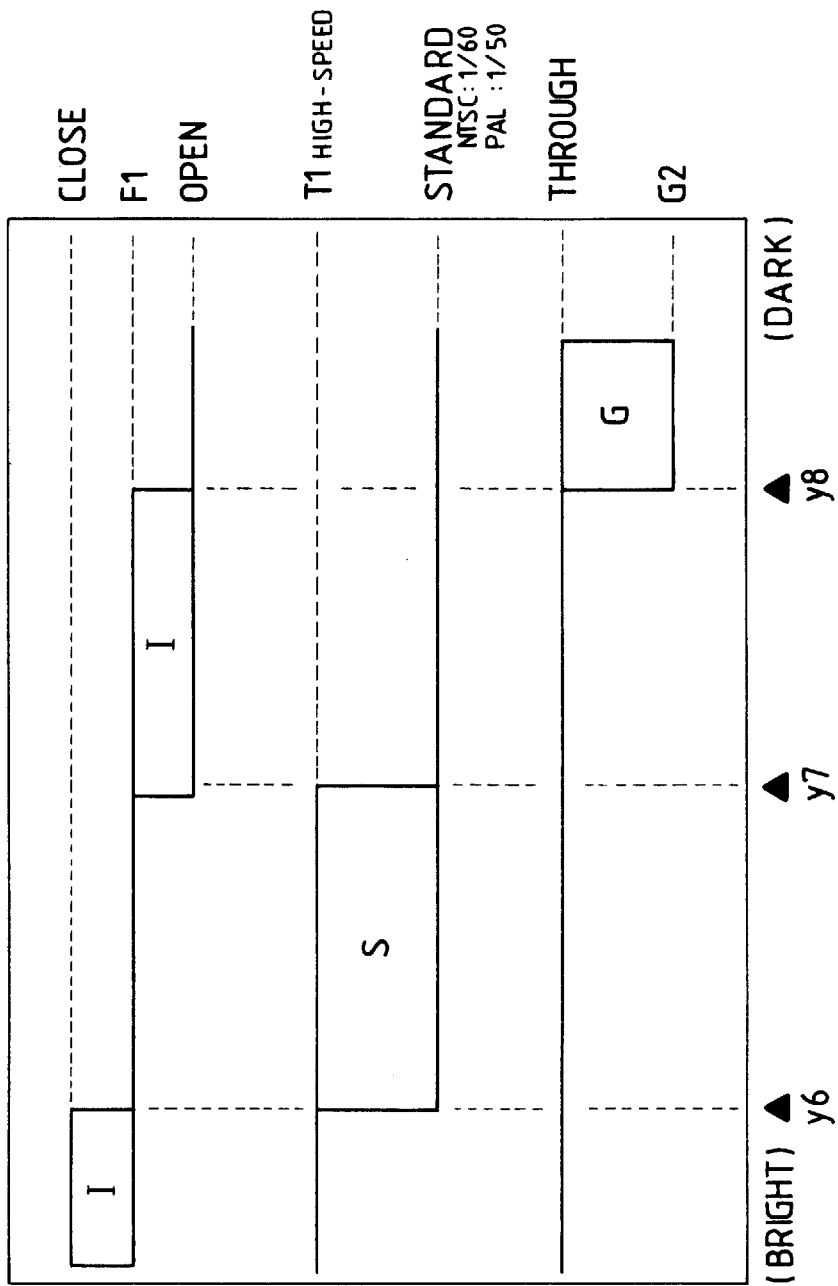
FIG. 31 is a program chart corresponding to the full auto mode shown in FIG. 30.

Also FIG. 30 shows the internal structure of a look-up table to be used in another phototaking situation in the full auto mode and providing another control characteristic, and FIG. 31 is a chart showing the transition of the control parameters, as a function of the object luminance, based on the data contained in the LUT shown in FIG. 30.

FIGS. 28 and 29 represent an indoor phototaking mode suitable for indoor phototaking in which the flicker is present, and FIGS. 30 and 31 represent a phototaking mode suitable in a situation without flicker.

Referring to FIG. 29, the input luminance level is divided into six areas by five threshold value y1 y5, and the control parameter I, S or G is assigned in each of said areas. As indicated on the right-hand side of the chart, the iris aperture is varied among a closed state, a predetermined value F1 and an open state; the shutter speed is varied among a high speed T1, a speed T2 of $\frac{1}{100}$ sec. (NTSC) to be used in the presence of flicker, and a standard speed of $\frac{1}{60}$ sec.; and the gain is varied among ±0 dB (through), a predetermined value G1 and a larger value G2. In FIG. 29, I, S and G respectively indicate the variable areas of said parameters.

FIG. 31 is similar in structure to FIG. 29, but, in this case, the input luminance level is divided into four areas by three threshold values y6–y8, and the control parameters are respectively assigned to these areas.

The present full auto mode, when selected by the operation unit 20, detects the flicker in the image signal by the system control circuit 25, and effects control by automatically selecting the LUT shown in FIG. 28 or 30 according to the presence or absence of the flicker. Thus, this single phototaking mode can respond to any phototaking condition by suitable switching of said LUT's. Also there may naturally be prepared other LUT's corresponding to phototaking conditions other than flicker.

In the following there will be given an explanation on the parameters contained in these drawings.

[P1: Iris Aperture Controlling Parameter]

The iris aperture controlling parameter varies according to the input parameter or the luminance level, and is defined by a function f(Y) of the input luminance.

In case the input luminance is higher than the threshold value y1 shown in FIG. 29, an instruction [→CAL] shown in FIG. 28 indicates that a calculation is required.

In this high luminance situation, the shutter speed is set at a relatively high speed T1 which is to avoid deterioration of the resolving power resulting from diffraction by the small aperture of the iris and which does not generate conspicuous flickering resulting from the fold-back components in the direction of time axis, and the gain of AGC is maintained at ±0 dB in order to avoid deterioration in the S/N ratio.

In case the input luminance is between y1 and y2, the iris is fixed at an aperture F1, as indicated by [F1] in FIG. 28, and the calculation is not required. The aperture F1 is so selected as not to cause the above-mentioned diffraction.

In case the input luminance is between y2 and y3, a calculation is required as indicated by [→CAL]. This area has the widest range of exposure control by the iris aperture.

The gain of AGC is maintained at ±0 dB, and the shutter speed, in the presence of flicker of the fluorescent lamp, is fixed at $\frac{1}{100}$ sec in case of NTSC standard or $\frac{1}{60}$ sec. in case of PAL standard, in order to cancel the variation in the irradiation energy of the fluorescent lamp, resulting from the AC power supply. In the absence of the flicker (FIGS. 30 and 31), the shutter speed is set at the standard time of $\frac{1}{60}$ sec. (NTSC) or $\frac{1}{50}$ sec. (PAL) in order to secure the exposure time.

In case the input luminance is lower than y3 in FIG. 28 or 29, the iris is set at the fully open aperture, as indicated by [→OPEN]. In this situation, since the object luminance has started to decrease, the gain of AGC is slightly elevated by such an amount as not to cause noticeable deterioration of the S/N ratio, and then the shutter speed, if higher than the standard speed, is gradually reduced to the standard speed.

Thus the control for the iris aperture is defined by dividing the entire input parameter range into four areas by means of three threshold values y1, y2 and y3.

[P2: Shutter Speed Controlling Parameter]

The shutter speed controlling parameter is defined by a function f(Y) of the input luminance, in relation to threshold values y1–y5.

In case the input luminance is higher than y1, the shutter speed is fixed at a high speed value T1, as indicated by [→T1]. The calculation is not required in this case.

The shutter speed T1 is selected relatively high, in order to avoid the small iris aperture as explained above, for example in a range from $\frac{1}{125}$ to $\frac{1}{500}$ sec.

In case the input luminance is between y1 and y2, a parameter value has to be set by calculating the optimum shutter speed according to the input luminance, as indicated by [→CAL].

Since the iris is fixed at an aperture not generating the diffraction, the shutter speed has to be made faster, corresponding to the increase in the amount of light, and the above-explained calculation is required for this reason.

In case the input luminance is between y2 and y4, the shutter speed is fixed at T2, and the calculation is not required in this case.

The shutter speed T2 corresponds to the charge accumulation time for avoiding the flicker of the fluorescent lamp, and is $\frac{1}{100}$ sec. in the NTSC standard or $\frac{1}{60}$ sec. in the PAL standard. However, in the absence of said flicker, the accumulation time is extended toward the standard time of the television signal, in order to effect the phototaking operation with a better S/N ratio.

The LUT shown in FIG. 30 is designed for a situation in which such flicker of the fluorescent lamp is absent, wherein the shutter speed is so controlled as not to stop at T2, and FIG. 31 shows the transition of three control parameters as a function of the input luminance. These charts will not be explained further, as they are similar to FIGS. 28 and 29.

The flicker of the fluorescent lamp can be identified as present or absent, respectively by the presence or absence of a periodic variation in the luminance of every field, monitored by the system control circuit 25.

According to the presence or absence of said flicker, the system control circuit 25 selects one of the LUT's, in the same full auto phototaking mode, thereby achieving optimum control matching the phototaking situation.

In case the input luminance is between y4 and y5, the parameter value is set by calculating the optimum shutter speed, as indicated by [→CAL].

Although a shutter speed faster than the standard television rate is normally selected in order to prevent the flicker, it becomes necessary, under a lower luminance situation, to enable the phototaking operation itself by setting the shutter at a slower speed, and said calculation is required for setting such slower shutter speed.

Since the shutter speed is variable in a small step in this area, continuous changes in the shutter speed does not give unnatural impression in the image.

In case the input luminance is lower than y5, the shutter speed is set at the standard value of the television signal, as indicated by [→STANDARD], and said standard value is 1/60 sec. in case of the NTSC standard or 1/50 sec. in case of the PAL standard.

In this state, the gain of AGC alone remains as the controllable parameter, and the exposure control is executed by elevating the gain within the permissible range of the S/N ratio.

[P3: Gain of AGC]

The gain of AGC is defined by a function f(Y) of the input luminance, depending on plural threshold values, and, if the input luminance is higher than y3, it is defined, by [±0 dB], at ±0 dB, whereby the AGC circuit does not have the amplification effect. Thus, while the exposure control is possible by the iris aperture and the shutter speed, the gain of AGC is fixed in order to prevent deterioration in the S/N ratio. The calculation is unnecessary in this case.

In case the input luminance is between y3 and y4, the gain controlling parameter is set by calculating the optimum gain, as indicated by [→CAL].

In case the input luminance is between y4 and y5, the gain is fixed at a predetermined value G1, and the calculation is not required.

In case the input luminance is less than y5, the gain controlling parameter is set by calculating the optimum gain, as indicated by [→CAL].

The relationships among three parameters in relation to the threshold values are shown in FIGS. 29 and 31. In the presence of flicker as shown in FIG. 29, the entire luminance range is divided into six areas by five threshold values, and the calculation is required, in each area, for only one parameter as shown in FIGS. 9 and 10. Said parameters to be calculated in respective areas are the iris (I), shutter (S), iris (I), gain (G), shutter (S) and gain (G) in the order from the high luminance side.

In the absence of flicker as shown in FIG. 31, the entire range is divided into four areas by the threshold values y6–y8, and the calculation is required for only one parameter in each area. Said calculated parameter is I, S, I and G in the order from the high luminance side.

[P4: AE Weighting Parameter=Weighting of Photometry Area]

This is a parameter defining the distribution and weighting of the light metering area in the image frame, as shown in FIGS. 7 and 8. It is a fixed parameter, stored in a map format as shown in FIG. 29. It has different set values for the different LUT's corresponding to the phototaking modes, but is fixed within each mode, regardless of the luminance signal level.

In the present embodiment, this parameter is directly assigned, in the format of a map, to the 24 areas. In this full auto mode, a coefficient 1.0 is assigned to the central 8 areas, while a smaller coefficient 0.5 is assigned to the peripheral 16 areas in the form of center weighted photometry shown in FIG. 7.

[P5: AE Reference Value Parameter]

The AE reference value parameter indicates a luminance level taken as the reference value. It is used for discriminating whether the exposure is excessive or deficient, and, in the present embodiment, set at 50 IRE. Also this parameter is fixed in each phototaking mode, regardless of the input luminance level.

[P6: Image Quality Regulating Parameter]

This parameter is used for designating the image quality regulating process, for example by aforementioned aperture control. It is defined by codes, and is fixed in each phototaking mode, regardless of the input luminance level.

This full auto mode employs the "NORMAL" setting, in which the basic image quality is taken as the reference, and a particular image processing is not executed.

[P7: Image Effect Process Parameter]

It is used for designating an image processing, such as fading explained in relation to FIG. 16, and the content of this parameter is defined by codes.

This full auto mode employs the "NORMAL" setting, in which the basic image quality is set as the reference state, without any particular processing.

It is fixed for each phototaking mode, regardless of the input luminance level.

As explained in the foregoing, the data table LUT of the present invention stores the definition and characteristics of the parameters required for the control, and plural LUT's are provided corresponding to the number of phototaking modes and are rendered selectable according to the selected phototaking mode, so that the optimum control can always be attained under any phototaking situation.

As explained in the foregoing, the image pickup device of the present invention, being capable of control of the phototaking operation with plural parameters, with set conditions of control data read from a data table matching the phototaking mode, provides the advantages of achieving more delicate control than in the conventional devices, and attaining an optimum phototaking operation merely by the selection of the phototaking mode, in various phototaking conditions.

Also in a certain phototaking mode, another data table may be selected under certain phototaking situation in order to enable control matching such situation, so that satisfactory automatic phototaking operation can be always realized even under significantly varying phototaking situation.

What is claimed is:

1. An image pickup device for effecting exposure control with plural control parameters, comprising:

image pickup means for picking up images;

means for setting a photometry area in an image frame;

means for detecting an input parameter, based on a luminance information in an image signal obtained from said photometry area by said image pickup means;

means for determining values of plural control parameters for exposure control according to the value of said input parameter, said plural control parameters being changeable control characteristics for the exposure control within a predetermined range which is divided into a plurality of portions, and the characteristics of predetermined at least two control parameters being set changeable at the same time in a predetermined border region of said plurality of portions;

switch means for switching, according to a photographing mode, the control characteristics of said control parameters for the exposure control performed according to the value of said input parameter; and photometry area change means for changing the photometry area in said image frame, synchronously with the switching operation of said switch means.

2. A device according to claim 1, wherein said control parameters are at least two of the shutter speed, iris aperture and gain of AGC.

3. A device according to claim 1, wherein said photometry area switch means is adapted to control position, size and weighting of the photometry area in said image frame.

4. A device according to claim 1, further comprising a mode selector switch for selectively switching plural phototaking modes.

5. A device according to claim 1, wherein the set values of the plural control parameters as a function of the input parameter are stored in the form of a data table corresponding to each of plural phototaking modes, and are switched synchronously with an operation of said switch means.

6. A device according to claim 2, further comprising image pickup elements, wherein said determining means varies the shutter speed by control of charge accumulation time of said image pickup elements.

7. A device according to claim 1, which constitutes a video camera.

8. A device according to claim 1, wherein said control parameters are divided into plural variable areas according to the value of said input parameter, and, in each of said divided areas, only one of said control parameters is rendered variable while others are fixed.

9. A device according to claim 1, wherein each of said control parameters, when varied in the value thereof between different two values, is varied through an intermediate value.

10. An image pickup device for effecting exposure control with plural control parameters, comprising:

image pickup means for picking up images;

means for detecting an input parameter constituting a reference for evaluation, based on the luminance information from an image signal outputted from said image pickup means;

means for determining the control parameters for exposure control, in relation to an iris aperture, accumulation time of said image pickup means and gain, performed according to a value of said input parameter, said control parameters being changeable control characteristics for exposure control within a predetermined range which is divided into a plurality of portions and the characteristics of predetermined at least two control parameters being set changeable at the same time in a predetermined border region of said plurality of portions.

11. A device according to claim 10, wherein said input parameter is a luminance level.

12. A device according to claim 10, wherein said selection means is a manually operable switch.

13. A device according to claim 10, wherein said at least two data memory means are provided for respective phototaking modes.

14. A device according to claim 10, further comprising automatic switch means capable of automatically switching said data memory means.

15. A device according to claim 14, wherein said automatic switch means is adapted to select said data memory means according to another input parameter different from said input parameter.

16. A device according to claim 15, wherein said another input parameter is flicker.

17. A device according to claim 13, wherein the phototaking modes include a portrait mode, a sports mode, a full auto mode, a landscape mode, a snow and surf mode, and a spotlight mode.

18. An image pickup device comprising:

a) an image sensor device for photoelectric conversion of incident light focused on an image pickup surface;

b) exposure control means for performing exposure control of a phototaking mode of said image pickup;

c) detection means for dividing an image frame into plural areas and detecting a luminance level in each of said areas;

d) means for preparing a histogram according to said luminance level obtained from an output of said detection means;

e) area selection means for selecting areas as exposure control areas from said plural areas in the image frame according to said histogram; and f) control means for controlling the exposure control of the phototaking mode, performed by said exposure control means, based on the luminance level in the exposure control areas selected by said area selection means.

19. A device according to claim 18, wherein said exposure control means has an iris aperture, shutter speed and gain as exposure control parameters.

20. A device according to claim 19, wherein said control means effects switching of said exposure control parameters and switching of said area selection means in mutual linkage.

21. A device according to claim 20, wherein said control means is adapted to set plural phototaking modes, and to switch the exposure control parameter and the photometry area according to the phototaking mode.

22. A device according to claim 21, further comprising a data table storing data for controlling said exposure control means and said area selection means, for each phototaking mode.

* * * * *

UNITED STATES PATENT AND TRADEMARK OFFICE
CERTIFICATE OF CORRECTION

PATENT NO. : 5,831,676
DATED : November 3, 1998
INVENTOR(S) : Koji Takahashi, et al.

It is certified that error appears in the above-identified patent and that said Letters Patent is hereby corrected as shown below:

Column 12, line 59, after "AGC" insert --5--.

Column 14, lines 23, 29 and 32, delete "X" and insert -- $\dot{X}$ --.

Column 23, lines 19 and 21, delete "X" and insert -- $\dot{X}$ --.

Signed and Sealed this

Seventeenth Day of August, 1999

Q. TODD DICKINSON

Attest:

Attesting Officer

Acting Commissioner of Patents and Trademarks